United States Patent
Park et al.

(10) Patent No.: US 12,052,193 B2
(45) Date of Patent: Jul. 30, 2024

(54) METHOD AND DEVICE FOR SETTING PILOT TONE IN WIDEBAND IN WIRELESS LAN SYSTEM

(71) Applicant: LG Electronics Inc., Seoul (KR)

(72) Inventors: Eunsung Park, Seoul (KR); Jinsoo Choi, Seoul (KR); Dongguk Lim, Seoul (KR); Jinmin Kim, Seoul (KR); Sunwoong Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 17/615,409

(22) PCT Filed: May 18, 2020

(86) PCT No.: PCT/KR2020/006476
§ 371 (c)(1),
(2) Date: Nov. 30, 2021

(87) PCT Pub. No.: WO2020/242105
PCT Pub. Date: Dec. 3, 2020

(65) Prior Publication Data
US 2022/0239434 A1    Jul. 28, 2022

(30) Foreign Application Priority Data

May 31, 2019  (KR) .................. 10-2019-0064896
Jul. 2, 2019   (KR) .................. 10-2019-0079646

(51) Int. Cl.
*H04W 84/12* (2009.01)
*H04L 5/00* (2006.01)

(52) U.S. Cl.
CPC ........... *H04L 5/0048* (2013.01); *H04W 84/12* (2013.01)

(58) Field of Classification Search
CPC .............................. H04L 5/0048; H04W 84/12
USPC ......................................................... 370/329
See application file for complete search history.

(56) References Cited

U.S. PATENT DOCUMENTS

2019/0097850 A1* 3/2019 Kenney ............... H04L 27/0012
2019/0109684 A1* 4/2019 Chen ....................... H04L 5/003

FOREIGN PATENT DOCUMENTS

KR    20140088130    7/2014
KR    20160048865    5/2016

OTHER PUBLICATIONS

Lim et al. "PPDU Format for 11bd," IEEE 802.11-19/739r3, May 2019, 21 pages.

* cited by examiner

*Primary Examiner* — Christopher R Crompton
(74) *Attorney, Agent, or Firm* — Fish & Richardson P.C.

(57) ABSTRACT

Proposed are a method and device for receiving an EHT PPDU on the basis of a tone plan in a wireless LAN system. Specifically, a reception STA receives the EHT PPDU from a transmission STA through a 320 MHz band. The reception STA decodes the EHT PPDU. The EHT PPDU includes a control field and a data field. The control field includes information about a pilot tone. The information about the pilot tone includes allocation information indicating that a first pilot tone for the 320 MHz band is configured by repeating a second pilot tone for an 80 MHz band defined in an 802.11ax wireless LAN system. The first pilot tone is received in a data field on the basis of the allocation information.

17 Claims, 25 Drawing Sheets

(a)

(b)

PPDU Format (IEEE 802.11a/g)

HT PPDU Format (IEEE 802.11n)

VHT PPDU Format (IEEE 802.11ac)

METHOD AND DEVICE FOR SETTING PILOT TONE IN WIDEBAND IN WIRELESS LAN SYSTEM

CROSS-REFERENCE TO RELATED APPLICATIONS

This application is a National Stage application under 35 U.S.C. § 371 of International Application No. PCT/KR2020/006476, filed on May 18, 2020, which claims the benefit of Korean Patent Application No. 10-2019-0064896, filed on May 31, 2019 and Korean Patent Application No. 10-2019-0079646, filed on Jul. 2, 2019. The disclosures of the prior applications are incorporated by reference in their entirety.

BACKGROUND

Field of the Disclosure

The present specification relates to a scheme of receiving an extremely high throughput (EHT) physical protocol data unit (PPDU) in a wireless local area network (WLAN) system based on a tone plan, and more particularly, to a method and apparatus for configuring a pilot tone in a wideband.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for configuring a pilot tone in a wideband in a wireless local area network (WLAN) system.

An example of the present specification proposes a method of configuring a pilot tone in a wideband.

The present embodiment may be performed in a network environment in which a next-generation WLAN system (IEEE 802.11be or high throughput (EHT) WLAN system) is supported. The next-generation WLAN system is a WLAN system evolved from an 802.11ax system, and may satisfy backward compatibility with the 802.11ax system.

The present embodiment proposes a method of configuring a tone plan and pilot tone used to transmit a single user (SU) physical protocol data unit (PPDU) or a multi-user (MU) PPDU in a wideband (240 MHz, 320 MHz band) supported in the EHT WLAN system.

The present embodiment may be performed by a transmitting station (STA), and the transmitting STA may correspond to an access point (AP). In the present embodiment, a receiving STA may correspond to an STA supporting an EHT WLAN system.

The transmitting STA generates an EHT PPDU.

The transmitting STA transmits the EHT PPDU to at least one receiving STA through the 320 MHz band. When the EHT PPDU is transmitted to one receiving STA, the EHT PPDU is the SU PPDU. When the EHT PPDU is transmitted to a plurality of receiving STAs, the EHT PPDU is the MU PPDU.

The EHT PPDU includes a control field and a data field. The control field includes information on a pilot tone.

The information on the pilot tone includes allocation information on that a first pilot tone for the 320 MHz band is configured by repeating a second pilot tone for an 80 MHz band defined in the 802.11ax WLAN system.

The first pilot tone is received in the data field, based on the allocation information.

According to an embodiment proposed in the present specification, since a pilot tone is designed in a wideband by directly using a pilot tone for the existing 11ax 80 MHz band, technical features of the 11ax WLAN system can be directly used. In addition, in the present specification, there is a new effect of minimizing wasted subcarriers and increasing subcarrier efficiency and throughput by designing a new pilot tone in a wideband.

DESCRIPTION OF EXEMPLARY EMBODIMENTS

Figure 1:
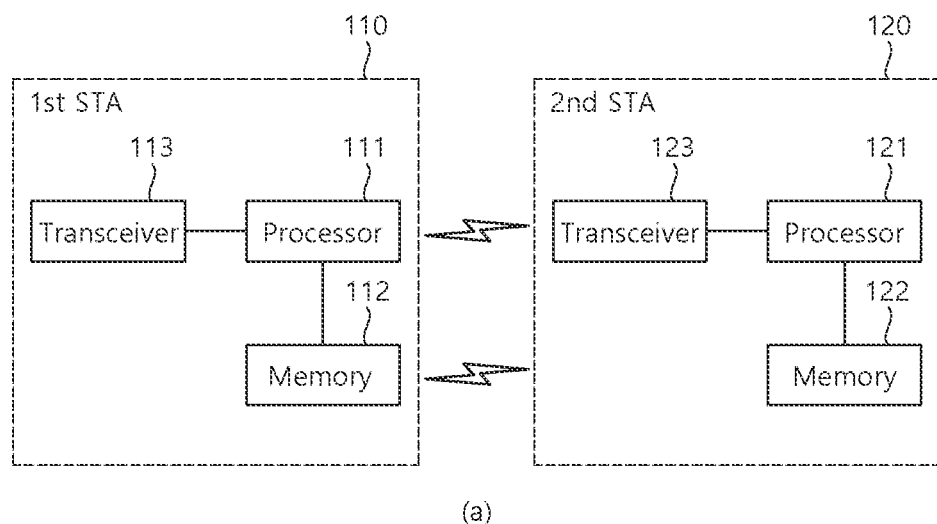
FIG. 1 shows an example of a transmitting apparatus and/or receiving apparatus of the present specification.
Figure 1:
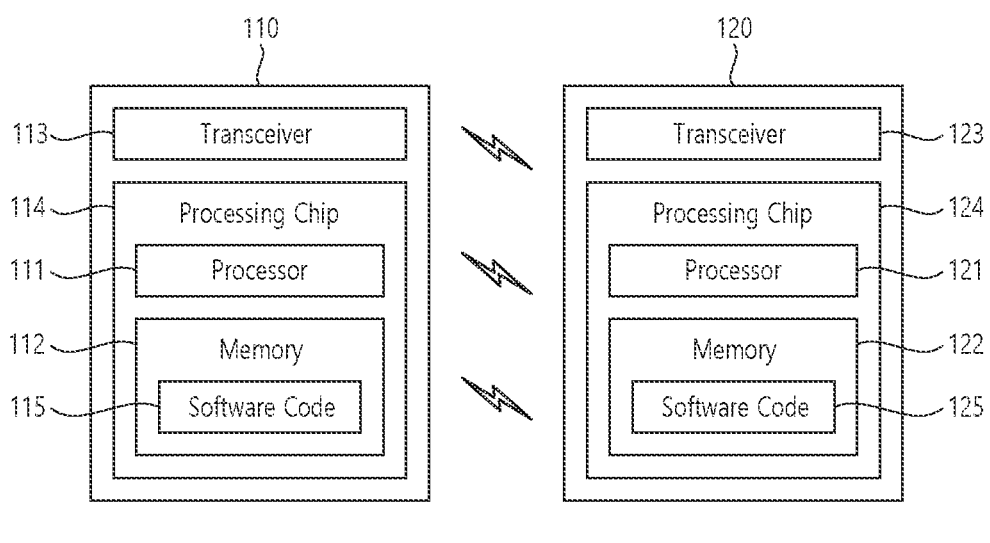

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
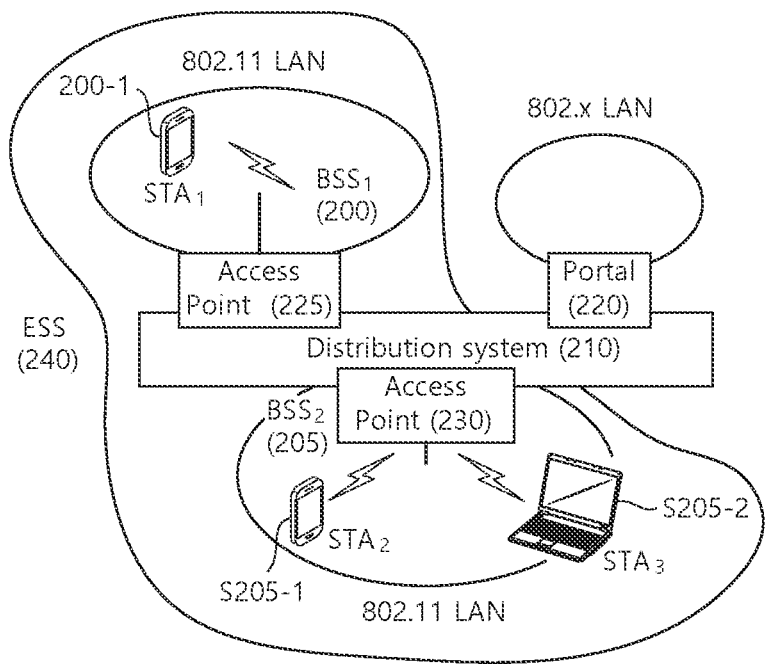
FIG. 2 is a conceptual view illustrating the structure of a wireless local area network (WLAN).
Figure 2:
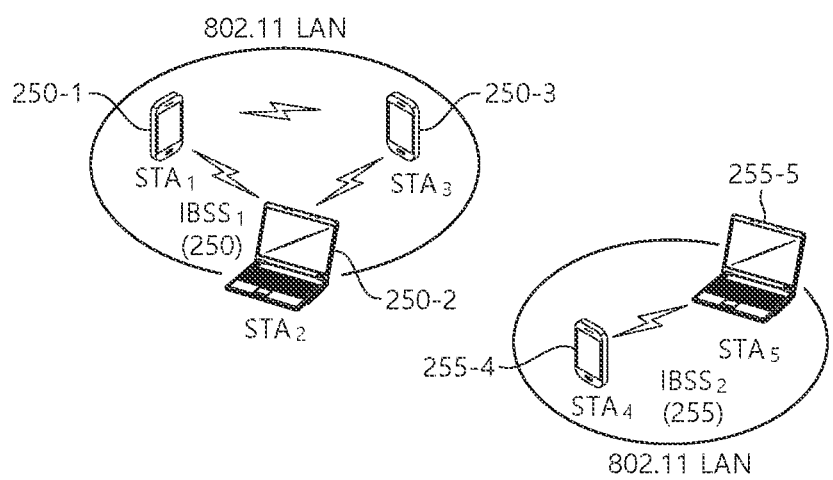

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
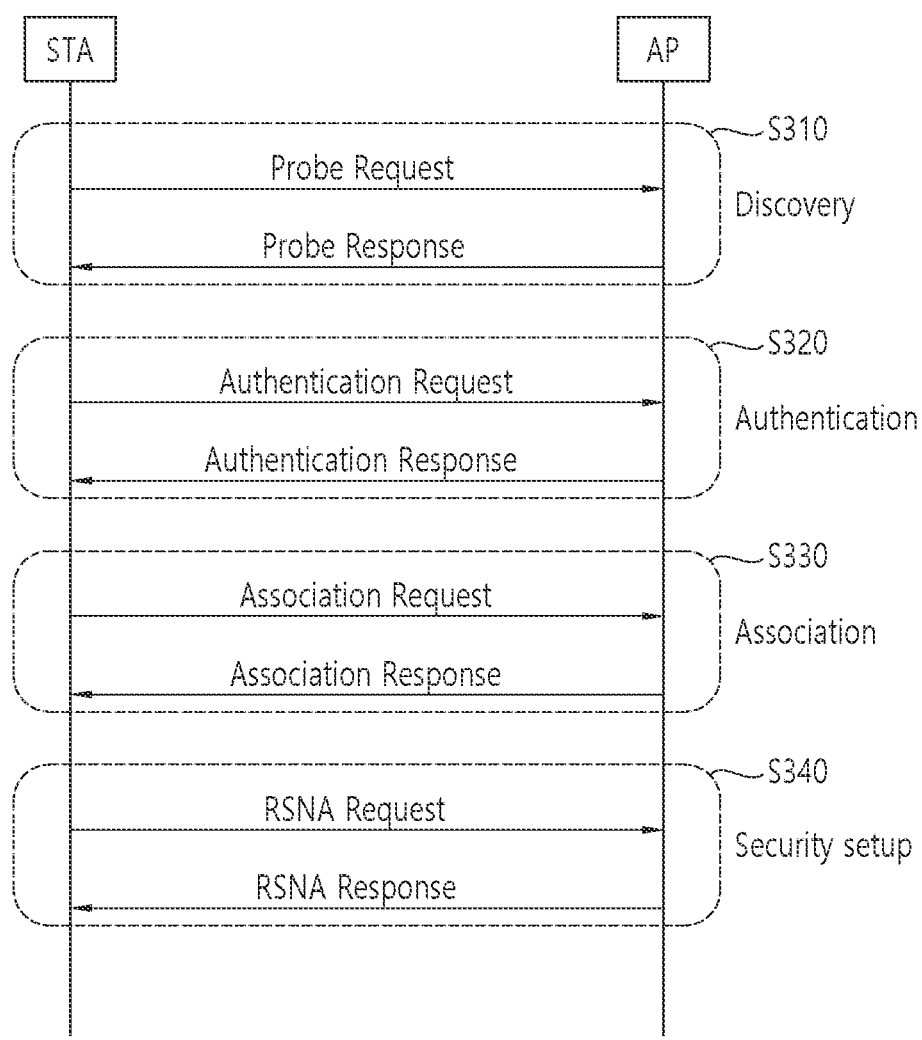
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
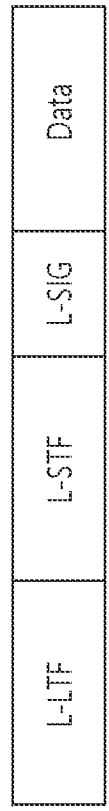
FIG. 4 illustrates an example of a PPDU used in an IEEE standard.
Figure 4:
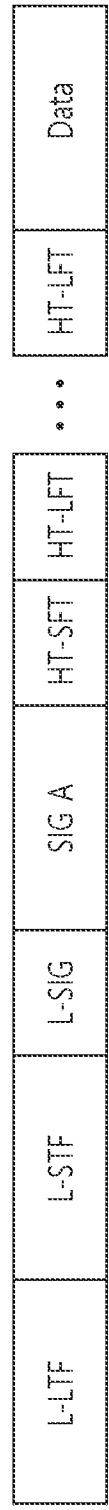
Figure 4:
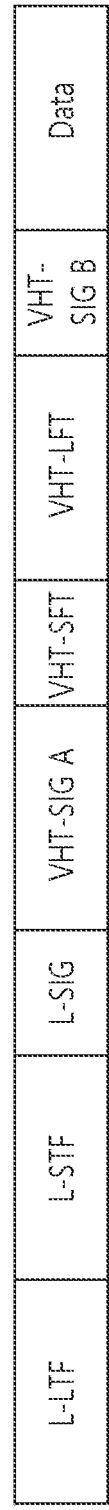
Figure 4:
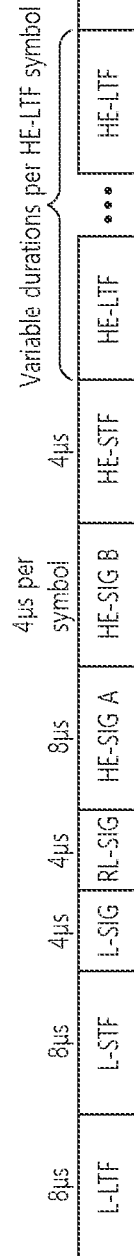

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
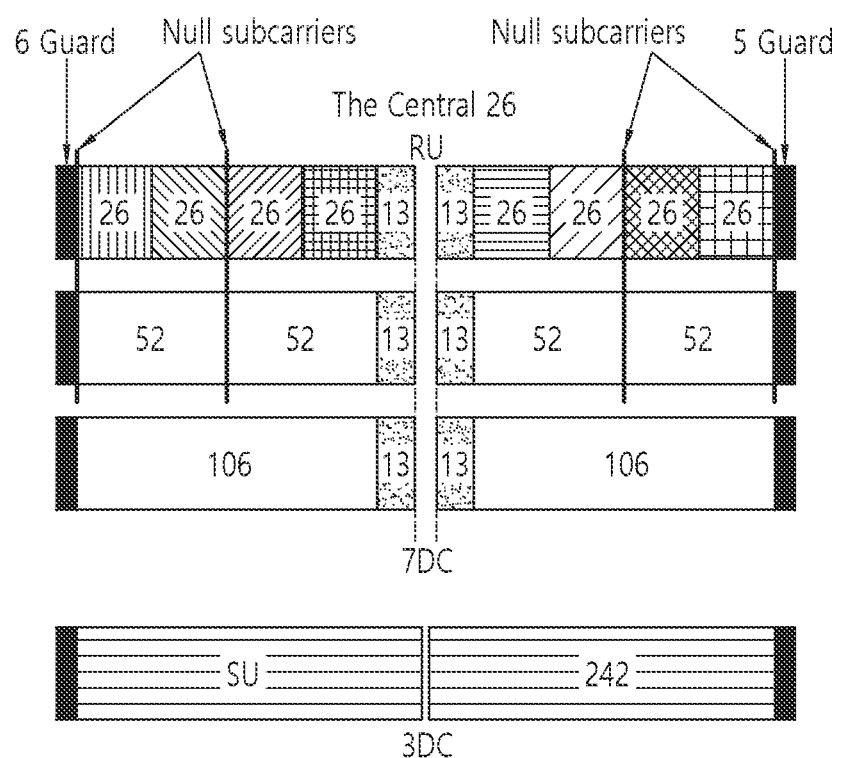
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
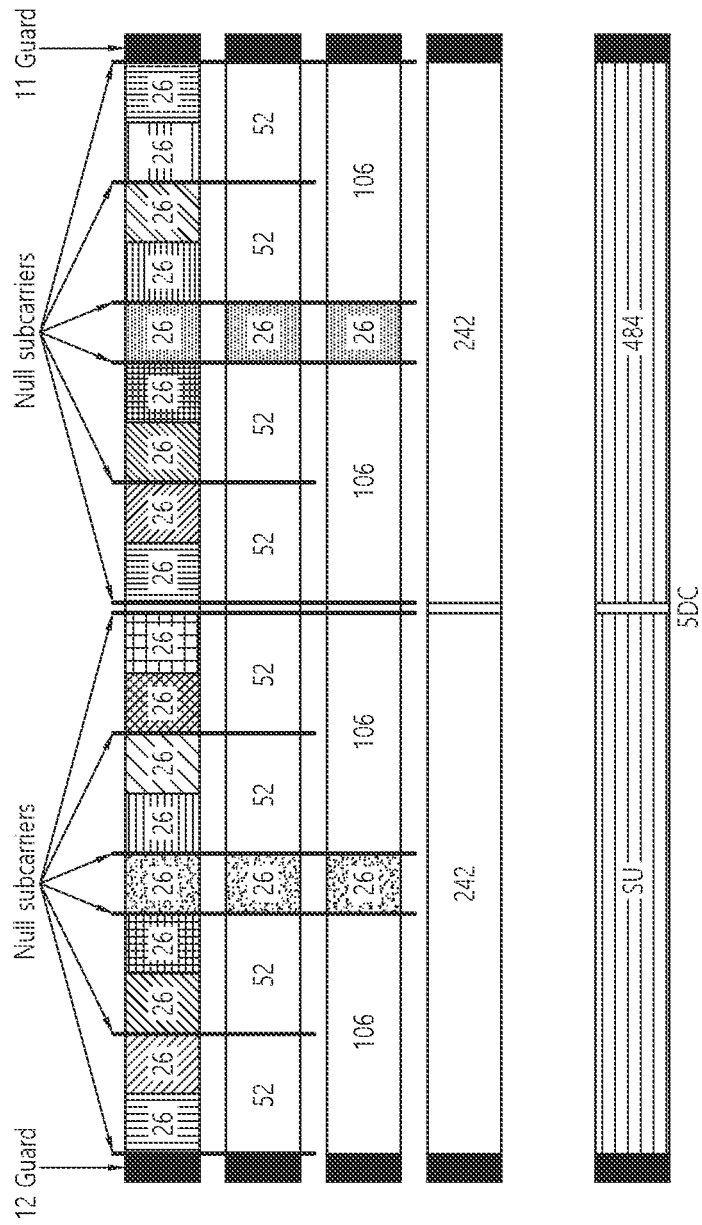
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
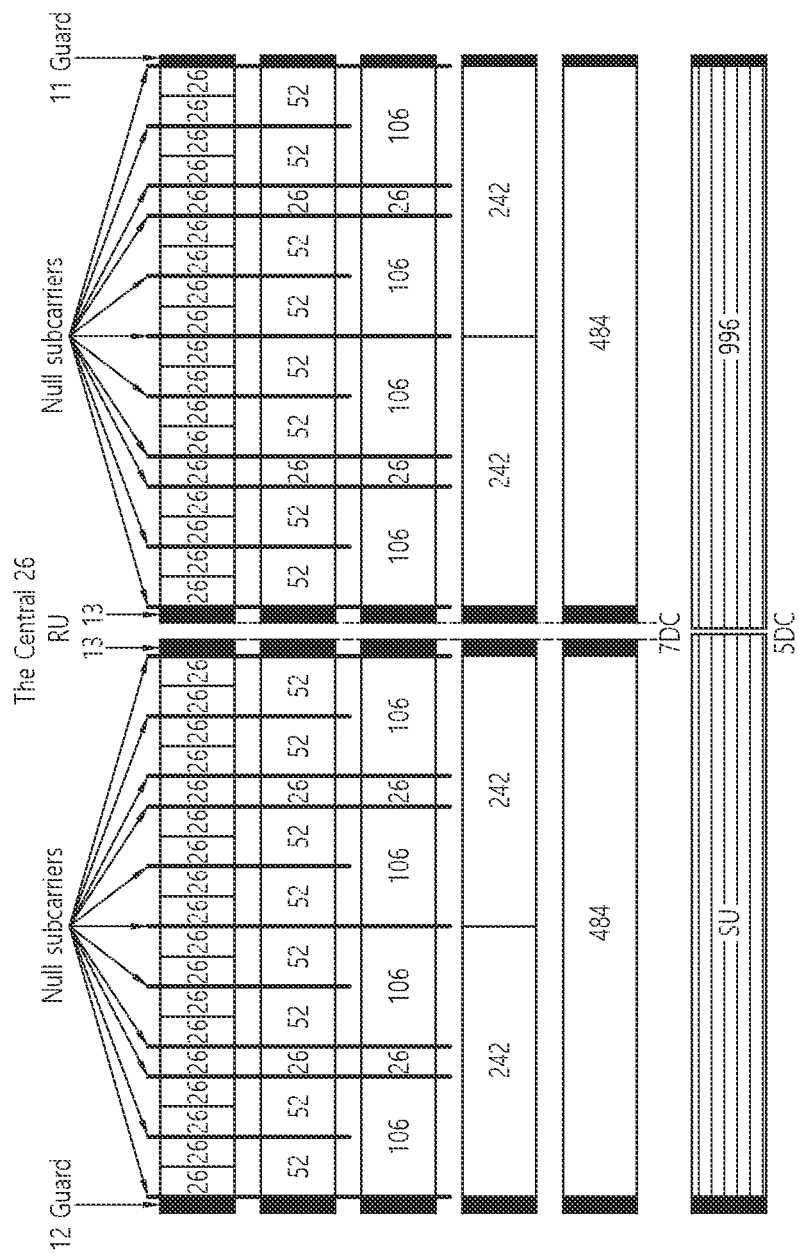
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
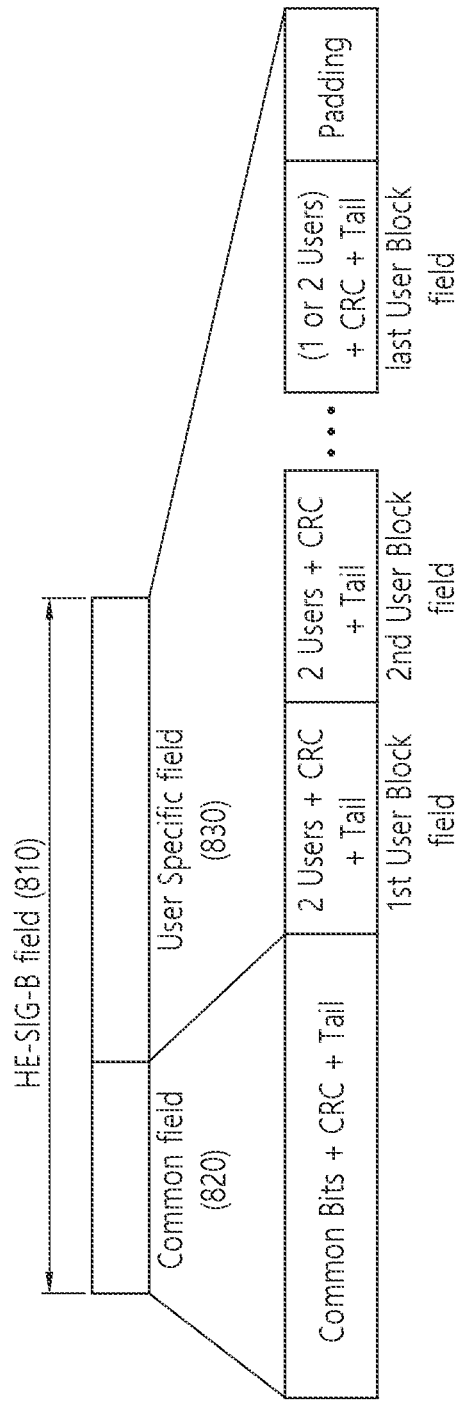
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | H6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
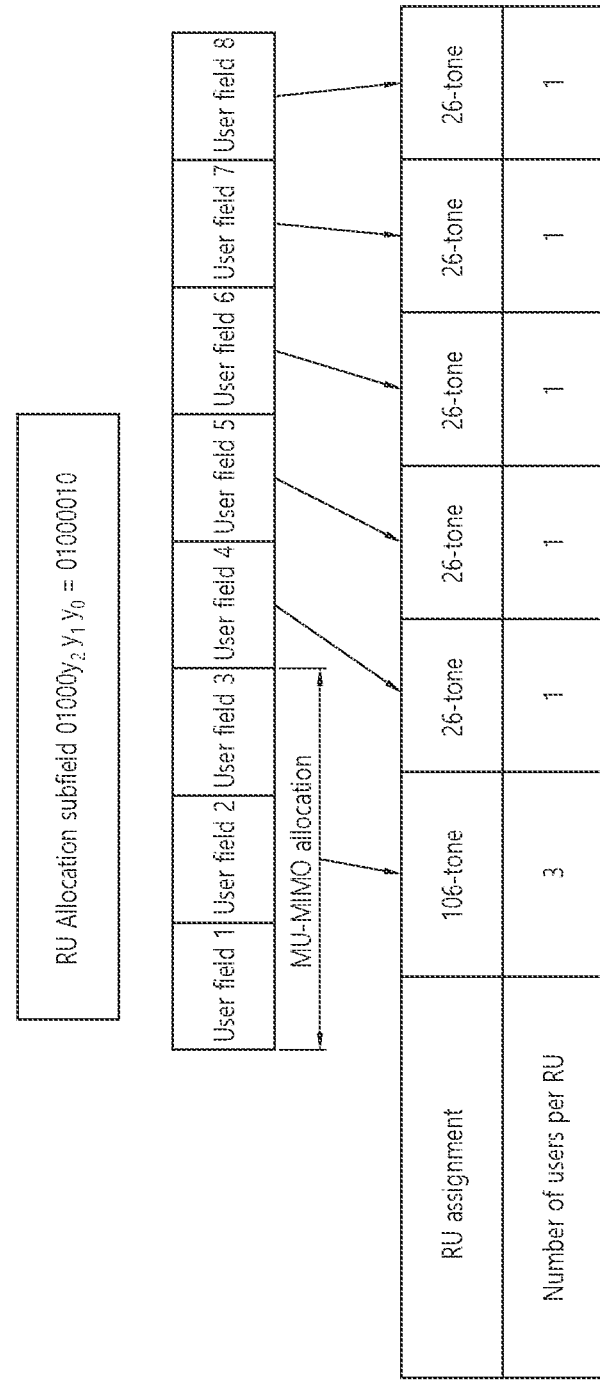
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0009-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 7 | 1 | 1 | | | | | 6-8 | |
|   | 0111 | 3 | 1-3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0011 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS [2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
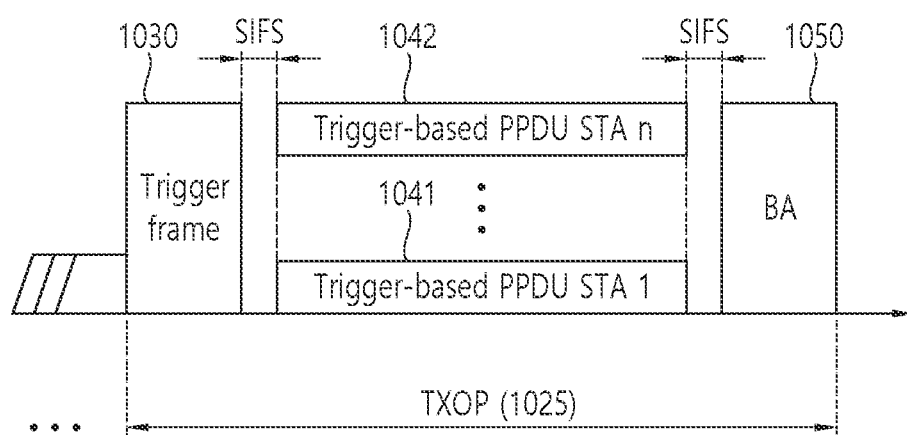
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
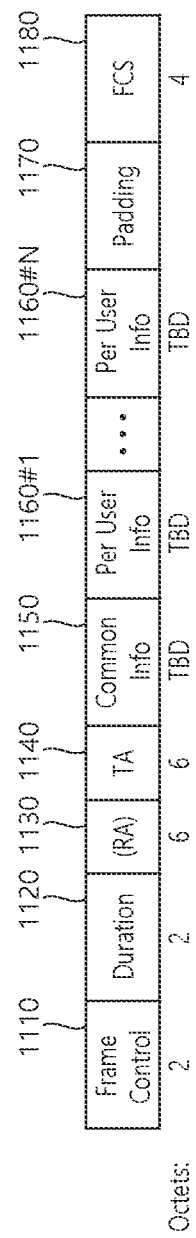
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
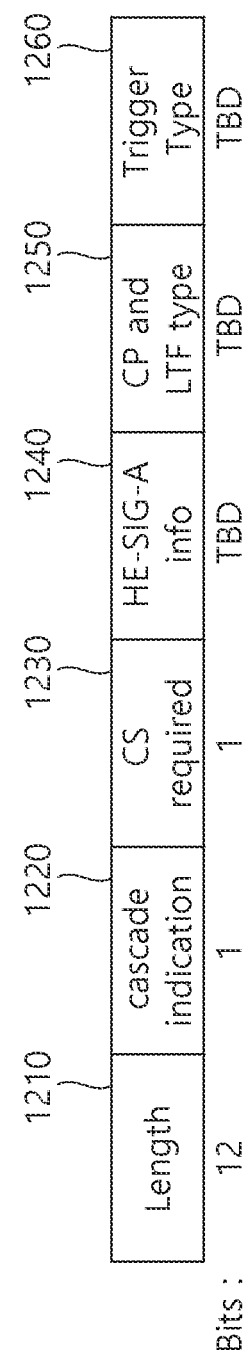
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
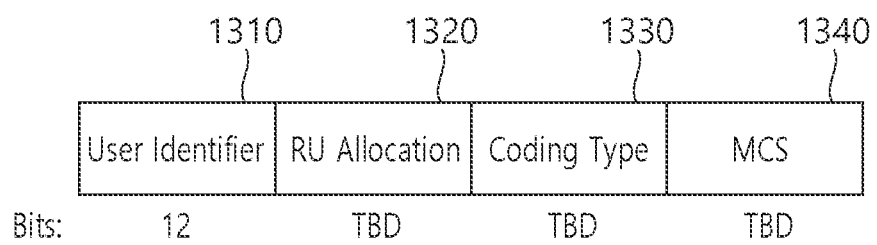
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
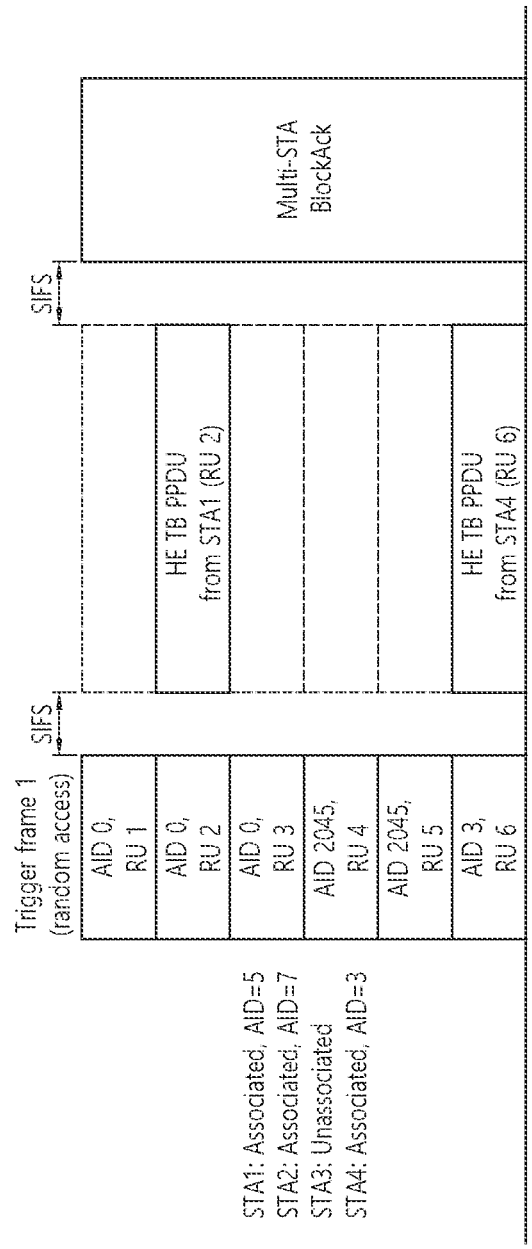
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
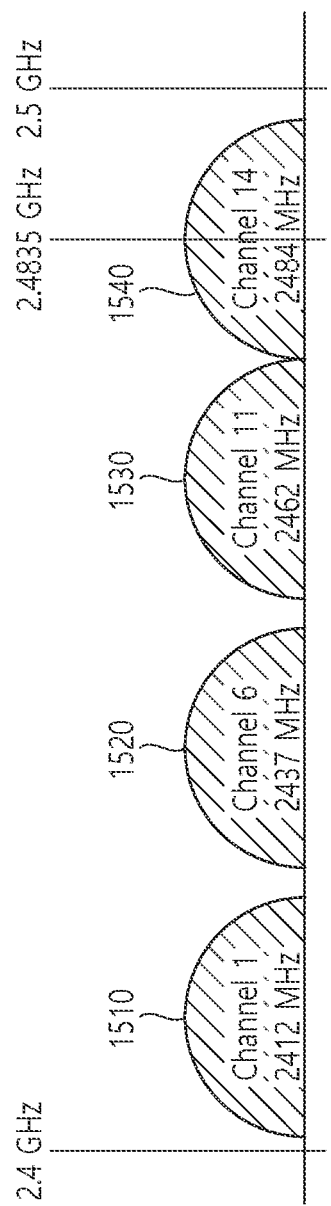
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
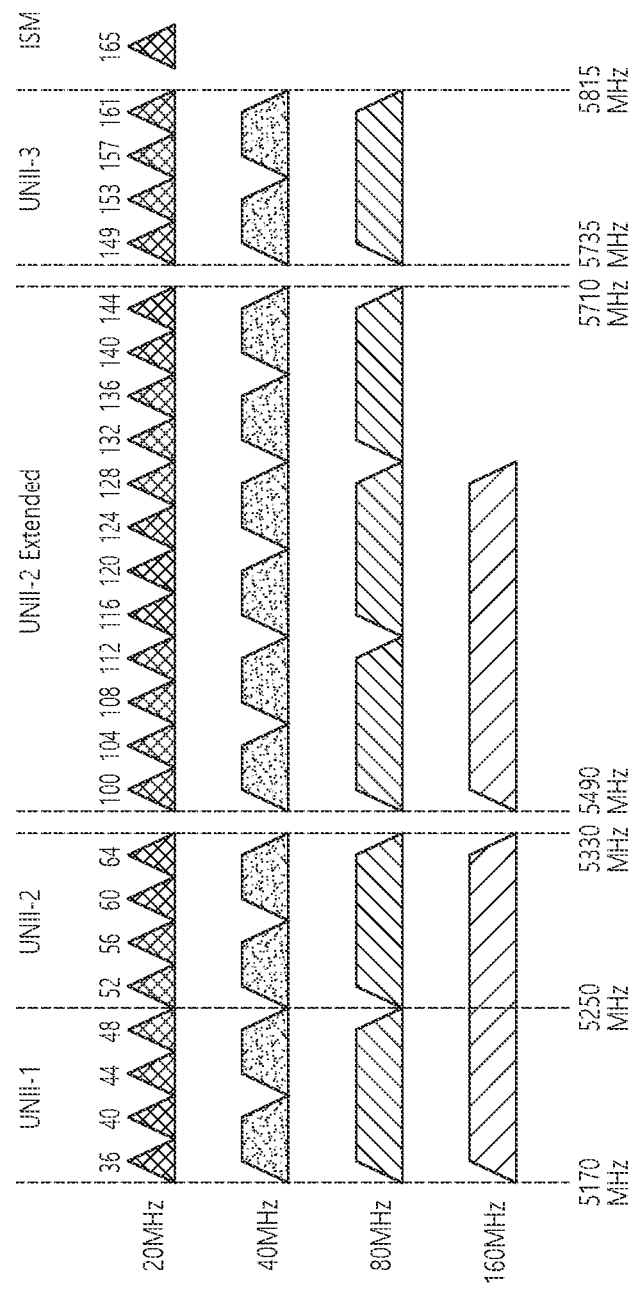
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
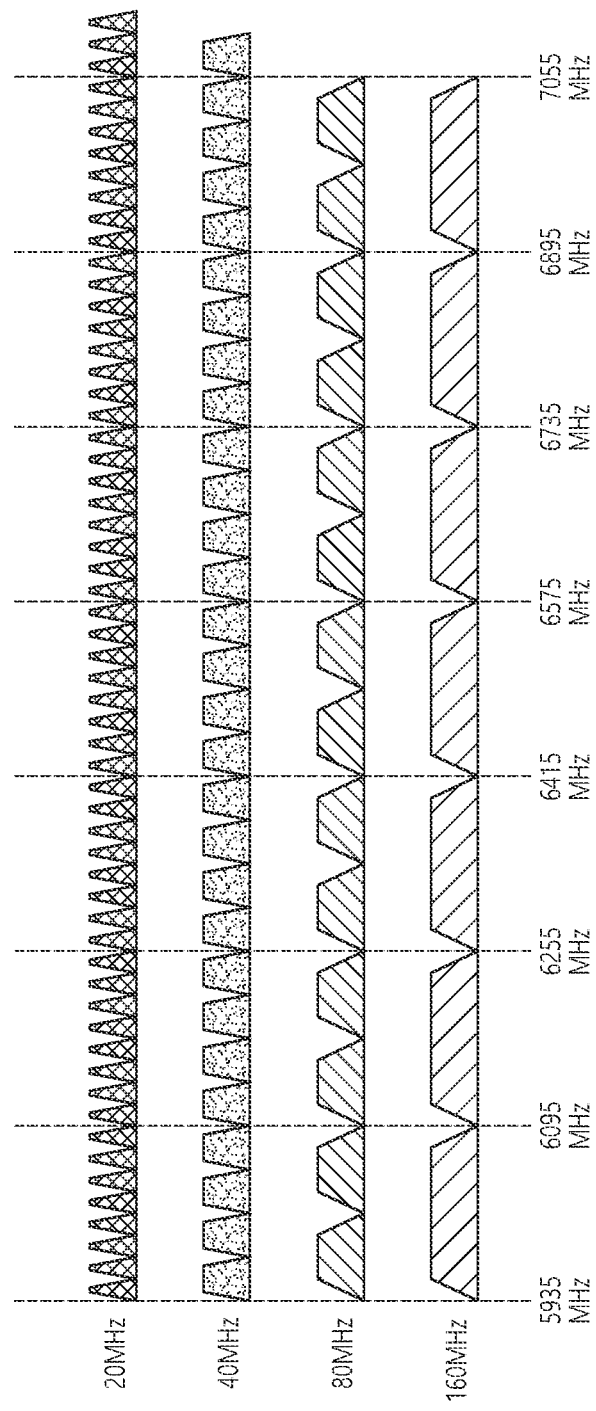
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
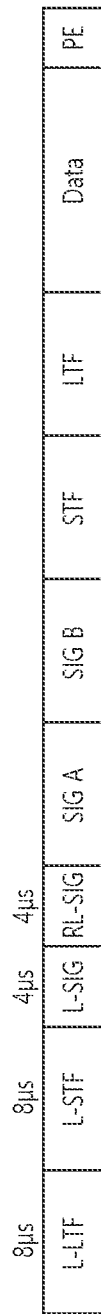
FIG. 18 illustrates an example of a PPDU used in the present specification.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

1. Tone Plan in 802.11ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index +1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, a 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
|---|---|---|
| 20 MHz | 26, 52 | ±69, ±122 |
|  | 106 | none |
|  | 242 | none |
| 40 MHz | 26, 52 | ±3, ±56, ±57, ±110, ±137, ±190, ±191, ±244 |
|  | 106 | ±3, ±110, ±137, ±244 |
|  | 242, 484 | none |
| 80 MHz | 26, 52 | ±17, ±70, ±71, ±124, ±151, ±204, ±205, ±258, ±259, ±312, ±313, ±366, ±393, ±446, ±447, ±500 |
|  | 106 | ±17, ±124, ±151, ±258, ±259, ±366, ±393, ±500 |
|  | 242, 484 | none |
|  | 996 | none |
| 160 MHz | 26, 52, 106 | {null subcarrier indices in 80 MHz − 512, null subcarrier indices in 80 MHz + 512} |
|  | 242, 484, 996, 2 × 996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4×HE-LTF. In 1×HE-LTF, the location of the pilot sequence in HE-LTF is configured based on pilot subcarriers for a data field multiplied 4 times. If the pilot subcarrier exists in 2×HE-LTF, the location of the pilot subcarrier shall be the same as a location of a pilot in a 4× data symbol. All pilot subcarriers are located at even-numbered indices listed below.

| Channel Width | RU Size | Pilot Subcarrier Indices |
|---|---|---|
| 20 MHz | 26, 52 | ±10, ±22, ±36, ±48, ±62, ±76, ±90, ±102, ±116 |
|  | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
|  | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
|  | 106, 242, 484 | ±24, ±50, ±92, ±118, ±158, ±184, ±226, ±252, ±266, ±292, ±334, ±360, ±400, ±426, ±468, ±494 |
|  | 996 | ±24, ±92, ±158, ±226, ±266, ±334, ±400, ±468 |
| 160 MHz | 26, 52, 106, 242, 484 | {pilot subcarrier indices in 80 MHz − 512, pilot subcarrier indices in 80 MHz + 512} |
|  | 996 | {for the lower 80 MHz, pilot subcarrier indices in 80 MHz − 512, for the upper 80 MHz, pilot subcarrier indices in 80 MHz + 512} |

At 160 MHz or 80+80 MHz, the location of the pilot subcarrier shall use the same 80 MHz location for 80 MHz of both sides.

3. Embodiment Applicable to the Present Specification

In the WLAN 802.11 system, in order to increase a peak throughput, transmission of an increased stream is considered by using more antennas or a wider band than the existing 11ax. In addition, a scheme of aggregating and using various bands is also considered in the present specification.

The present specification proposes a pilot tone applied to each of SU and MU PPDUs by considering a case of using a wideband, in particular, a situation of using a contiguous or non-contiguous 160/240/320 MHz band.

Technical features related to a tone plan described below and an indication for this may directly use technical features in 11ax. For example, a tone plan of 11ax may also be equally applied to an RU of the 11be/EHT standard. That is, the tone plan of flax may also be equally applied to an RU included in an STF/LTF/data field in an EHT PPDU. In addition, technical features applied to FIG. 5 to FIG. 7 of the present specification, that is, a location of an RU included in a specific frequency band, a size of the RU, a pilot signal in the RU, and a location of a null subcarrier disposed between the RUs may also be equally applied to the EHT PPDU described below.

Figure 19:
FIG. 19 illustrates an example of an EHT PPDU described in the present specification.

FIG. 19 illustrates an example of an EHT PPDU described in the present specification.

Referring to FIG. 19, the EHT PPDU includes a legacy preamble part, i.e., L-STF, L-LTF, and L-SIG, and an EHT part, i.e., U-SIG, EHT-SIG, EHT-STF, EHT-LTF, and data. The legacy preamble part is transmitted first in the EHT PPDU. In addition, phase rotation is applied to the legacy preamble part. The EHT PPDU includes a repeated L-SIG (RL-SIG) in which L-SIG is repeated, and the RL-SIG is located immediately after the L-SIG.

Four extra subcarriers are applied to the L-SIG and the RL-SIG. An index of the extra subcarrier is [−28, −27, 27, 28], and is modulated with BPSK. As in the 802.11ax, a coefficient [−1 −1 −1 1] is mapped to the extra subcarrier.

Figure 20:
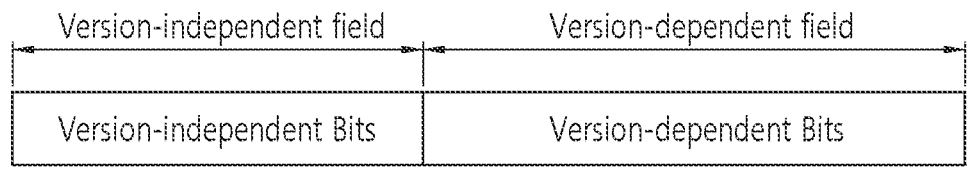
FIG. 20 illustrates an example of a U-SIG described in the present specification.

FIG. 20 illustrates an example of a U-SIG described in the present specification.

Referring to FIG. 20, the U-SIG is a field in which two OFDM symbols are jointly encoded, and is located immediately after RL-SIG. The U-SIG includes a version independent field. The version independent field is aiming at achieving better coexistence between next-generation 802.11 standards. In addition, the U-SIG also includes a version dependent field. The U-SIG is transmitted by using 52 data tones and 4 pilot tones per 20 MHz. The U-SIG is modulated in the same way as the HE-SIG-A field of 802.11ax.

The U-SIG includes version dependent bits after the version independent bits. The version independent bits are defined by static locations and bits in different generations/PHY versions. The version dependent bits are defined as variable bits in respective PHY versions. A version independent field of the U-SIG may also include bandwidth information. The bandwidth information may also include puncturing information.

The U-SIG may be duplicated within a band of 80 MHz (1 2 1 2 by being duplicated in unit of 20 MHz). At a band of 160 MHz or higher, the U-SIG may be duplicated in unit of 80 MHz (1 2 1 2 1 2 1 2), or may not be duplicated (1 2 1 2 3 4 3 4).

An EHT-SIG may be duplicated within a band of 80 MHz (1 2 1 2 by being duplicated in unit of 20 MHz). At a band of 160 MHz or higher, the EHT-SIG may be duplicated in unit of 80 MHz (1 2 1 2 1 2 1 2), or may not be duplicated (1 2 1 2 3 4 3 4).

In the existing 11ax, a tone plan and pilot tone for SU and MU PPDU transmission at 20/40/80/80+80/160 MHz are designed, and a tone plan and pilot tone of 160 MHz are designed by simply repeating two times the existing 80 MHz tone plan. Similarly, in the 11be, the existing flax tone plan and pilot tone are directly used in 20/40/80 MHz, and may be extended based on the 80 MHz tone plan in a wideband bandwidth. Alternatively, a new tone plan and pilot tone may be proposed to increase efficiency and throughput of a subcarrier to be used, by minimizing a wasted subcarrier. A tone plan and pilot tone used in SU and MU PPDUs in a wide bandwidth are proposed below.

3.1. MU PPDU

An EHT MU PPDU in a format similar to that of the existing 11ax HE MU PPDU may be used.

That is, the EHT MU PPDU may include the entirety or part of a field of the HE MU PPDU format defined in the 802.11ax system. In addition, the following tone plan may be applied to part (e.g., EHT-STF/EHT-LTF/data) of the EHT MU PPDU. In addition, the following pilot tone may be applied to part (e.g., EHT-LTF/data) of the EHT MU PPDU. A subcarrier frequency spacing of 78.125 kHz may be applied to the EHT-STF/EHT-LTF/data. Alternatively, a subcarrier frequency spacing of 312.5/N kHz (N is any positive number) may be applied. In addition, the entirety or part of the legacy part (i.e., L-STF, L-STF, L-SIG) and/or EHT-SIG of the EHT MU PPDU may be generated based on the subcarrier frequency spacing of 312.5 kHz. In the following proposal, the subcarrier frequency spacing of 78.125 kHz, which is the same as in 11ax, is considered in the data part, and thus a subcarrier (or tone) index at each bandwidth is as follows.

Tone index in 160 MHz band: −1024~1023,
Tone index in 240 MHz band: −1536~1535,
Tone index in 320 MHz band: −2048~2047
The existing 11ax 80 MHz tone plan is as follows.

| RU type | RU index and subcarrier range | | | | |
|---|---|---|---|---|---|
| 26-tone RU | RU 1 [−499:−474] | RU 2 [−473:−448] | RU 3 [−445:−420] | RU 4 [−419:−394] | RU 5 [−392:−367] |
| | RU 6 [−365:−340] | RU 7 [−339:−314] | RU 8 [−311:−286] | RU 9 [−285:−260] | |
| | RT 10 [−257:−232] | RU 11 [−231:−206] | RU 12 [−203:−178] | RU 13 [−177:−152] | RU 14 [−150:−125] |
| | RU 15 [−123:−98] | RU 16 [−97:−72] | RU 17 [−69:−44] | RU 18 [−43:−18] | RU 19 [−16:−4, 4:16] |
| | RU 20 [18:43] | RU 21 [44:69] | RU 22 [72:97] | RU 23 [98:123] | RU 24 [125:150] |
| | RU 25 [152:177] | RU 26 [178:203] | RU 27 [206:231] | RU 28 [232:257] | |
| | RU 29 [260:285] | RU 30 [286:311] | RU 31 [314:339] | RU 32 [340:365] | RU 33 [367:392] |
| | RU 34 [394:419] | RU 35 [420:445] | RU 36 [448:473] | RU 37 [474:499] | |
| 52-tone RU | RU 1 [−499:−448] | RU 2 [−445:−394] | RU 3 [−365:−314] | RU 4 [−311:−260] | |
| | RU 5 [−257:−206] | RU 6 [−203:−152] | RU 7 [−123:−72] | RU 8 [−69:−18] | |
| | RU 9 [18:69] | RU 10 [72:123] | RU 11 [152:203] | RU 12 [206:257] | |
| | RU 13 [260:311] | RU 14 [314:365] | RU 15 [394:445] | RU 16 [448:499] | |
| 106-tone RU | RU 1 [−499:−394] | RU 2 [−365:−260] | RU 3 [−257:−152] | RU 4 [−123:−18] | |
| | RU 5 [18:123] | RU 6 [152:257] | RU 7 [260:365] | RU 8 [394:499] | |
| 242-tone RU | RU 1 [−500:−259] | RU 2 [−258:−17] | RU 3 [17:258] | RU 4 [259:500] | |
| 484-tone RU | RU 1 [−500:−17] | | RU 2 [17:500] | | |
| 996-tone RU | RU 1 [−500:−3, 3:500] | | | | |

The subcarrier index of 0 corresponds to the DC tone. Negative subcarrier indices correspond to subcarries with frequency lower than the DC tone, and positive subcarrier indices correspond to subcarriers with frequency higher than the DC tone.
RU 19 is the center 26-tone RU.

The 996-tone RU consists of 980 data subcarriers and 16 pilot subcarriers. A pilot location of the 996-tone RU is described above.

For the 160 MHz and 80+80 MHz HE PPDU formats, locations of the 996-tone RUs are fixed to subcarriers [−1012: −515, −509: −12] and [12: 509, 515: 1012] every half of a bandwidth.

The 2×996-tone RU consists of two 996-tone RUs, and one RU is defined for each of 80 MHz channels for the 160 MHz and 80+80 MHz HE PPDU formats.

The 80 MHz HE MU PPDU and HE TB PPDU having at least one RU smaller than the 996-tone RU have 7 DCs located at a subcarrier index [−3:3]. The 80 MHz HE SU PPDU, HE MU PPDU, and HE TB PPDU having one 996-tone RU have 5 DCs located at a subcarrier index [−2:2]. A structure used in the 80 MHz HE PPDU is used for all of primary 80 MHz and secondary 80 MHz channels in the 160 MHz and 80+80 MHz HE PPDUs. A DC subcarrier is located at a subcarrier index [−11:11].

For an OFDMA tone plan used in the MU PPDU, a transmitting STA repeats the existing 11ax 80 MHz tone plan in a contiguous/non-contiguous situation. Likewise, for the pilot tone, a format in which the existing 11ax 80 MHz pilot tone is repeated is used.

A. 160 MHz

A transmitting STA may directly use the existing 11ax 160 MHz OFDMA tone plan and pilot tone of corresponding RUs. The existing 11ax 160 MHz pilot tone includes a left (or primary) 80 MHz pilot tone and a right (or secondary) 80 MHz pilot tone. A tone index of the left 80 MHz pilot tone is a tone index−512 of the existing 11ax 80 MHz pilot tone, and a tone index of the right 80 MHz pilot tone is a tone index+512 of the existing 11ax 80 MHz pilot tone.

B. 240 MHz

A transmitting STA may configure a 240 MHz tone plan by combining three existing 11ax 80 MHz OFDMA tone plans. This may be expressed as follows by considering both contiguous and non-contiguous situations.

80+80+80 MHz/160+80 MHz/80+160 MHz/240 MHz

+ means non-contiguous, and 160/240 means that ⅔ 80 MHz tone plans are contiguously arranged in succession.

When 160 MHz is used, a tone index of a left 80 MHz tone plan and pilot is a tone index−512 of the existing 80 MHz tone plan and pilot, and a tone index of a right 80 MHz tone plan and pilot is a tone index+512 of the existing 80 MHz tone plan and pilot.

When 240 MHz is used, a tone index of a center 80 MHz tone plan and pilot is directly a tone index of the existing 80 MHz tone plan and pilot, a tone index of the leftmost 80 MHz tone plan and pilot is a tone index−1024 of the existing 80 MHz tone plan and pilot, and a tone index of the rightmost 80 MHz is a tone index+1024 of the existing 80 MHz tone plan and pilot.

The non-contiguous 240 MHz may be used only in case of 160+80 MHz/80+160 MHz.

C. 320 MHz

A transmitting STA may configure a 320 MHz tone plan by combining four existing 11ax 80 MHz OFDMA tone plans. This may be expressed as follows by considering both contiguous and non-contiguous situations.

80+80+80+80 MHz/160+80+80 MHz/80+160+80 MHz/80+80+160 MHz/160+160 MHz/240+80 MHz/80+240 MHz/320 MHz

+ means non-contiguous, and 160/240/320 means that 2/3/4 80 MHz tone plans are contiguously arranged in succession.

When 160 MHz is used, a tone index of a left 80 MHz tone plan and pilot is a tone index−512 of the existing 80 MHz tone plan and pilot, and a tone index of a right 80 MHz tone plan and pilot is a tone index+512 of the existing 80 MHz tone plan and pilot.

When 240 MHz is used, a tone index of a center 80 MHz tone plan and pilot is directly a tone index of the existing 80 MHz tone plan and pilot, a tone index of the leftmost 80 MHz tone plan and pilot is a tone index−1024 of the existing 80 MHz tone plan and pilot, and a tone index of the rightmost 80 MHz is a tone index+1024 of the existing 80 MHz tone plan and pilot.

When 320 MHz is used, a tone index of a first left 80 MHz tone plan and pilot is a tone index−1536 of the existing 80 MHz tone plan and pilot, a tone index of a second left 80 MHz tone plan and pilot is a tone index−512 of the existing 80 MHz tone plan and pilot, a tone index of a third left 80 MHz tone plan and pilot is a tone index+512 of the existing 80 MHz tone plan and pilot, and a tone index of a fourth left 80 MHz tone plan and pilot is a tone index+1536 of the existing 80 MHz tone plan and pilot.

The non-contiguous 320 MHz may be used only in case of 160+160 MHz.

2. SU PPDU

An EHT SU PPDU in a format similar to that of the existing 11ax HE SU PPDU may be used.

That is, the EHT SU PPDU may include the entirety or part of a field of the HE SU PPDU format. In addition, the following tone plan may be applied to part (e.g., EHT-STF/EHT-LTF/data) of the EHT SU PPDU. In addition, the following pilot tone may be applied to part (e.g., EHT-LTF/data) of the EHT SU PPDU. A subcarrier frequency spacing of 78.125 kHz may be applied to the EHT-STF/EHT-LTF/data. Alternatively, a subcarrier frequency spacing of 312.5/N kHz (N is any positive number) may be applied. In addition, the entirety or part of the legacy part (i.e., L-STF, L-STF, L-SIG) and/or EHT-SIG of the EHT SU PPDU may be generated based on the subcarrier frequency spacing of 312.5 kHz. In the following proposal, the subcarrier frequency spacing of 78.125 kHz, which is the same as in 11ax, is considered in the data part, and thus a subcarrier (or tone) index at each bandwidth is as follows.

Tone index in 160 MHz band: −1024~1023,
Tone index in 240 MHz band: −1536~1535,
Tone index in 320 MHz band: −2048~2047

For a tone plan used in the SU PPDU, a new tone plan may be applied to improve a throughput. For a pilot tone, instead of a new definition, a pilot tone applied to the OFDMA tone plan of the MU PPDU may be used directly or may be selected in part for use. Alternatively, the existing 11ax 80 MHz tone plan and pilot tone may be repeatedly used. Alternatively, only pilot tone may be selected in part for use.

A. 160 MHz i) The existing contiguous and non-contiguous situation may be directly used in contiguous and non-contiguous situations. That is, 160 MHz SU PPDU transmission may be achieved by using a 2×996-tone-RU. For a pilot tone, a pilot tone applied to a corresponding RU of the existing 11ax 160 MHz may also be directly used. Alternatively, in the contiguous 160 MHz situation, a new pilot tone may be configured from the pilot tone applied to the existing 2×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2. For consistency with the legacy system, it may be preferably selected in units of n spaces from the DC tone. In the non-contiguous 160 MHz situation, a new pilot tone may be configured from the pilot tone applied to the existing 2×996-tone RU by selecting only a pilot tone in units of n spaces from a lower frequency pilot, in units of n spaces from a high frequency pilot, in units of n spaces from two pilots at the center, or in units of n spaces from pilots at both ends. For example, n is a natural number, and may be 2. For consistency with the legacy system, it may be preferably selected in units of n spaces from the two pilots at the center. A pilot tone designed in a corresponding contiguous/non-contiguous bandwidth may always be equally applied irrespective of 160 MHz SU tone plan configuration.

ii) Alternatively, a new tone plan may be applied to improve a throughput in the contiguous situation, and the following example may be used.

12 left guard tone, 11 right guard tone, 5DC, 2020-tone RU or 12 left guard tone, 11 right guard tone, 7DC, 2018-tone RU However, the pilot tone applied to the existing 2×996-tone RU may also be directly applied to a corresponding tone plan. Alternatively, a new pilot tone may be configured from the pilot tone applied to the existing 2×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2. For consistency with the legacy system, it may be preferably selected in units of n spaces from the DC tone.

n may be set appropriately by considering residual CFO compensation performance and throughput. If n is 2, the number of pilots is 16, which is the same as the number of pilots of 996-tone RUs, and it may be appropriate since performance is not significantly degraded even in case of residual CFO compensation.

B. 240 MHz i) A new tone plan may be applied to improve a throughput in the contiguous situation, and the following example may be used.

12 left guard tone, 11 right guard tone, 5DC, 3044-tone RU or 12 left guard tone, 11 right guard tone, 7DC, 3042-tone RU However, in the OFDMA tone plan of the 240 MHz MU PPDU described in the clause '1. MU PPDU', the pilot tone applied to the 3×996-tone RU may also be directly applied to a corresponding tone plan. Alternatively, a new pilot tone may be configured from the pilot tone applied to the existing 3×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2 or 3. For consistency with the legacy system, it may be preferably selected in units of n spaces from the DC tone.

In addition, the following contiguous/non-contiguous situation may be considered.

ii) A transmitting STA may configure a 240 MHz tone plan by combining three existing 11ax 80 MHz tone plans. That is, contiguous/non-contiguous 240 MHz SU PPDU transmission may be achieved by using a 3×996-tone-RU, and in the OFDMA tone plan of the 240 MHz MU PPDU described in the clause '1. MU PPDU', the pilot tone applied to the 3×996-tone RU may also be directly used. Alternatively, in a contiguous 240 MHz situation, a new pilot tone may be configured from the pilot tone applied to the existing 3×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2 or 3. For consistency with the legacy system, it may be preferably selected in units of n spaces from the DC tone. In a non-contiguous situation, a new pilot tone may be configured from the pilot tone applied to the existing 3×996-tone RU by selecting only a pilot tone in units of n spaces from a lower frequency pilot, in units of n spaces from a high frequency pilot, in units of n spaces from two pilots at the center, or in units of n spaces from pilots at both ends. For example, n is a natural number, and may be 2 or 3. For consistency with the legacy system, it may be preferably selected in units of n spaces from the two pilots at the center. A pilot tone designed in a corresponding contiguous/non-contiguous bandwidth may always be equally applied irrespective of 240 MHz SU tone plan configuration.

n may be set appropriately by considering residual CFO compensation performance and throughput. If n is 3, the number of pilots is 16, which is the same as the number of pilot, of 996-tone RUs, and it may be appropriate since performance is not significantly degraded even in case of residual CFO compensation.

iii) Alternatively, a scheme in which the 160 MHz new tone plan and the 11ax 80 MHz tone plan are repeated may be used. That is, a 2020+996-tone RU may be used. This may be expressed as follows by considering both contiguous and non-contiguous situations.

160+80 MHz/80+160 MHz/240 MHz

+ means non-contiguous. 240 means that the 11ax 80 MHz tone plan and the 160 MHz new tone plan are contiguously arranged in succession, and the order is changeable.

A 160 MHz new tone plan and a corresponding pilot tone may be used in 160 MHz, and an 11ax 80 MHz tone plan and a corresponding pilot tone may be used in 80 MHz.

When 240 MHz is used, if the 11ax 80 MHz tone plan is used at the left side, the tone index is tone index−1024 of the existing 11ax 80 MHz tone plan and pilot, and if the 11ax 80 MHz tone plan is used at the right side, the tone index is tone index+1024 of the existing 11ax 80 MHz tone plan and pilot. If the 160 MHz new tone plan is used at the left side, the tone index is tone index−512 of the 160 MHz new tone plan and pilot, and if the 160 MHz new tone plan is used at the right side, the tone index is tone index+512 of the 160 MHz new tone plan and pilot.

The non-contiguous 240 MHz may be used only in case of 160+80 MHz/80+160 MHz.

C. 320 MHz i) A new tone plan may be applied to improve a throughput in the contiguous situation, and the following example may be used.

12 left guard tone, 11 right guard tone, 5DC, 4068-tone RU 12 left guard tone, 11 right guard tone, 7DC, 4066-tone RU However, in the OFDMA tone plan of the 320 MHz MU PPDU described in the clause '1. MU PPDU', the pilot tone applied to the 4×996-tone RU may also be directly applied to a corresponding tone plan. Alternatively, a new pilot tone may be configured from the pilot tone applied to the existing 4×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2 or 4. For consistency with the legacy system, it may be preferably selected in units of n spaces from the DC tone.

In addition, the following contiguous/non-contiguous situation may be considered.

ii) A transmitting STA may configure a 320 MHz tone plan by combining four existing 11ax 80 MHz tone plans. That is, contiguous/non-contiguous 320 MHz SU PPDU transmission may be achieved by using a 4×996-tone-RU, and in the OFDMA tone plan of the 320 MHz MU PPDU described in the clause '1. MU PPDU', the pilot tone applied to the 4×996-tone RU may also be directly used. Alternatively, in a contiguous 320 MHz situation, a new pilot tone may be configured from the pilot tone applied to the existing 4×996-tone RU by selecting only a pilot tone in units of n spaces from a low tone index, in units of n spaces from a high tone index, in units of n spaces from a DC tone to a tone of which an absolute value of a tone index is great, or in units of n spaces from the tone of which the absolute value of the tone index is great to the DC tone. For example, n is a natural number, and may be 2 or 4. For consistency with the legacy system, it may be preferably selected in units of n spaces from the DC tone. In a non-contiguous situation, a new pilot tone may be configured from the pilot tone applied to the existing 4×996-tone RU by selecting only a pilot tone in units of n spaces from a lower frequency pilot, in units of n spaces from a high frequency pilot, in units of n spaces from two pilots at the center, or in units of n spaces from pilots at both ends. For example, n is a natural number, and may be 2 or 4. For consistency with the legacy system, it may be preferably selected in units of n spaces from the two pilots at the center. A pilot tone designed in a corresponding contiguous/non-contiguous bandwidth may always be equally applied irrespective of 320 MHz SU tone plan configuration.

n may be set appropriately by considering residual CFO compensation performance and throughput. If n is 4, the number of pilots is 16, which is the same as the number of pilots of 996-tone RUs, and it may be appropriate since performance is not significantly degraded even in case of residual CFO compensation.

iii) Alternatively, the 320 MHz tone plan may use a scheme in which the 160 MHz new tone plan is repeated two times. That is, a 2×2020-tone RU may be used. This may be expressed as follows by considering both contiguous and non-contiguous situations.

160+160 MHz/320 MHz

+ means non-contiguous, and 320 means that two new 160 MHz tone plans are contiguously arranged.

A 160 MHz new tone plan and a corresponding pilot tone may be used in 160 MHz.

When 320 MHz is used, a tone index of a left 160 MHz tone plan and pilot is a tone index−1024 of the new 160 MHz tone plan and pilot, and a tone index of a right 160 MHz tone plan is a tone index+1024 of the new 160 MHz tone plan and pilot.

iv) Alternatively, a transmitting STA may configure the 320 MHz tone plan by combining the 160 MHz new tone plan and two 11ax 80 MHz tone plans. That is, a 2020+2×996-tone RU may be used. This may be expressed as follows by considering both contiguous and non-contiguous situations.

160+80+80 MHz/80+160+80 MHz/80+80+160 MHz/ 160+160 MHz/240+80 MHz/80+240 MHz/320 MHz

+ means non-contiguous. 240 means that the 11ax 80 MHz tone plan and the 160 MHz new tone plan are contiguously arranged in succession, and the order is changeable. 320 means that two 11ax 80 MHz tone plans and the 160 MHz new tone plan are contiguously arranged in succession, and the order is changeable.

A 160 MHz new tone plan and a corresponding pilot tone may be used in 160 MHz, and an 11ax 80 MHz tone plan and a corresponding pilot tone may be used in 80 MHz.

When 240 MHz is used, if the 11ax 80 MHz tone plan is used at the left side, the tone index is tone index−1024 of the existing 11ax 80 MHz tone plan and pilot, and if the 11ax 80 MHz tone plan is used at the right side, the tone index is tone index+1024 of the existing 11ax 80 MHz tone plan and pilot. If the 160 MHz new tone plan is used at the left side, the tone index is tone index−512 of the 160 MHz new tone plan and pilot, and if the 160 MHz new tone plan is used at the right side, the tone index is tone index+512 of the 160 MHz new tone plan and pilot.

When 320 MHz is used, if the 11ax 80 MHz tone plan is used at the left side, the tone index is tone index−1536 of the existing 11ax 80 MHz tone plan and pilot, if the 11ax 80 MHz tone plan is used at the center, the tone index is tone index+512 of the existing 11ax 80 MHz tone plan and pilot, and if the 11ax 80 MHz tone plan is used at the right side, the tone index is tone index+1536 of the existing 11ax 80 MHz tone plan and pilot. If the 160 MHz new tone plan is used at the left side, the tone index is tone index−1024 of the 160 MHz new tone plan and pilot, if the 11ax 160 MHz tone plan is used at the center, the tone index is directly the tone index of the existing 11ax 160 MHz tone plan and pilot, and if the 160 MHz new tone plan is used at the right side, the tone index is tone index+1024 of the 160 MHz new tone plan and pilot.

v) Alternatively, the transmitting STA may configure the 320 MHz tone plan by combining the 240 MHz new tone plan and the 11ax 80 MHz tone plan. That is, a 3044+996-tone RU may be used. This may be expressed as follows by considering both contiguous and non-contiguous situations.

240+80 MHz/80+240 MHz/320 MHz

+ means non-contiguous. The 320 MHz 11ax 80 MHz tone plan and the 240 MHz new tone plan are contiguously arranged in succession, and the order is changeable.

The 240 MHz new tone plan and a corresponding pilot tone may be used in 240 MHz, and the 11ax 80 MHz tone plan and a corresponding pilot tone may be used.

When 320 MHz is used, if the 11ax 80 MHz tone plan is used at the left side, the tone index is tone index−1536 of the existing 11ax 80 MHz tone plan and pilot, and if the 11ax 80 MHz tone plan is used at the right side, the tone index is tone index+1536 of the existing 11ax 80 MHz tone plan and pilot. If the 240 MHz new tone plan is used at the left side, the tone index is tone index−512 of the 240 MHz new tone plan and pilot, and if the 240 MHz new tone plan is used at the right side, the tone index is tone index+512 of the 240 MHz new tone plan and pilot.

The non-contiguous 320 MHz may be used only in case of 160+160 MHz.

In wide bandwidth MU PPDU transmission, the transmitting STA may design a pilot tone by repeating a tone plan in which the existing 11ax 80 MHz tone plan is repeated and a pilot tone of a corresponding tone plan irrespective of contiguous, non-contiguous bandwidths. Meanwhile, in contiguous wide bandwidth SU PPDU transmission, a new tone plan may be used to increase a throughput, whereas a pilot tone may be designed based on a pilot tone of an RU corresponding to the entire bandwidth in MU PPDU transmission. In particular, in this case, the number of pilot tone may be set to 16, which is the same as in the 996-tone RU, when considering the throughput and residual CFO compensation performance. A non-contiguous wide bandwidth SU PPDU may be configured based on a tone plan and pilot tone of an MU PPDU, and some contiguous parts of a non-contiguous bandwidth may be configured with a new tone plan. A pilot tone may be designed based on a pilot tone of a corresponding new tone plan.

In an MU-MIMO situation where transmission is performed using the entire bandwidth, since transmission is performed basically using an MU PPDU, transmission may be performed using an RU and a pilot tone corresponding to the entire bandwidth in the OFDMA tone plan proposed above. Since a specific tone plan and pilot tone are used in OFDMA MU transmission and MU MIMO transmission, only the OFDMA tone plan and a pilot tone corresponding thereto need to be applied in the MU PPDU. However, since the existing 11ax STA cannot participate in MU MIMO transmission using a wideband bandwidth of 240/320 MHz, that is, since only the EHT STA can participate in the MU MIMO transmission using the wideband bandwidth of 240/320 MHz, the SU tone plan proposed above for throughput improvement and a pilot tone corresponding thereto may be used. That is, when the MU PPDU is transmitted while information indicating the MU MIMO situation using the entire bandwidth rather than OFDMA transmission is contained in the SIG-A or SIG-B field in the MU PPDU, a tone plan and pilot tone used in this case may be a tone plan and pilot tone used in the SU PPDU. In addition, an STA which receives the MU PPDU may recognize that the SU tone plan and the pilot tone corresponding thereto are used by using the information and may decode data. Therefore, a tone plan and pilot tone of the SU PPDU may be added to the tone plan and pilot tone of the 240/320 MHz MU PPDU. The same may also be equally applied to the 160 MHz situation.

Figure 21:
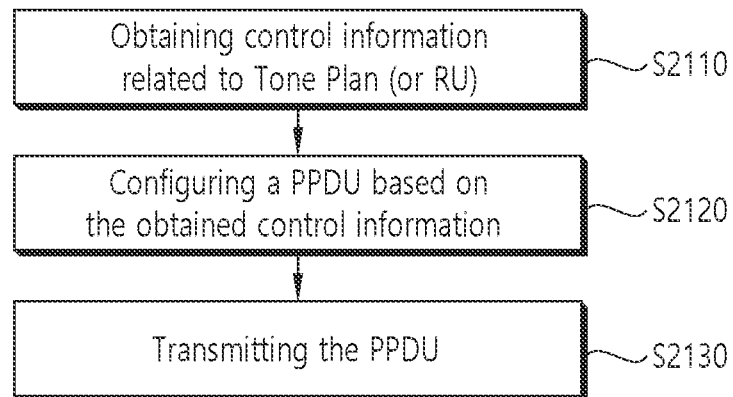
FIG. 21 is a procedural flowchart illustrating an operation of a transmitting device according to the present embodiment.

FIG. 21 is a procedural flowchart illustrating an operation of a transmitting device according to the present embodiment.

An example of FIG. 21 may be performed by a transmitting device (AP and/or non-AP STA). Each step (or specific sub-step described below) of the example of FIG. 21 may be omitted or changed in part.

In step S2110, the transmitting device (transmitting STA) may obtain information on the aforementioned tone plan. As described above, the information on the tone plan includes a size and location of an RU, control information related to the RU, information on a frequency band in which the RU is included, information on an STA which receives the RU, information on a location of a pilot tone and the number of pilot tones, or the like.

In step S2120, the transmitting device may configure/generate a PPDU, based on the obtained control information. The operation of configuring/generating the PPDU may include an operation of configuring/generating each field of the PPDU. That is, the step S2120 includes an operation of configuring an EHT-SIG-A/B/C field including the control information on the tone plan. That is, the step S2120 may include an operation of configuring a field including control information (e.g., N-bit map) indicating the size/location of the RU and/or an operation of configuring a field including an identifier (e.g., AID) of an STA which receives the RU.

In addition, the step S2120 may include an operation of generating an STF/LTF sequence transmitted through a specific RU. The STF/LTF sequence may be generated based on a pre-set STF generation sequence/LTF generation sequence.

In addition, the step S2120 may include an operation of generating a data field (i.e., MPDU) transmitted through the specific RU.

In step S2130, the transmitting device may transmit the PPDU configured through the step S2120 to a receiving device, based on the step S2130.

While performing the step S2130, the transmitting device may perform at least one of operations such as CSD, spatial mapping, IDFT/IFFT operation, GI inserting, etc.

The signal/field/sequence configured according to the present specification may be transmitted in the format of FIG. 19.

Figure 22:
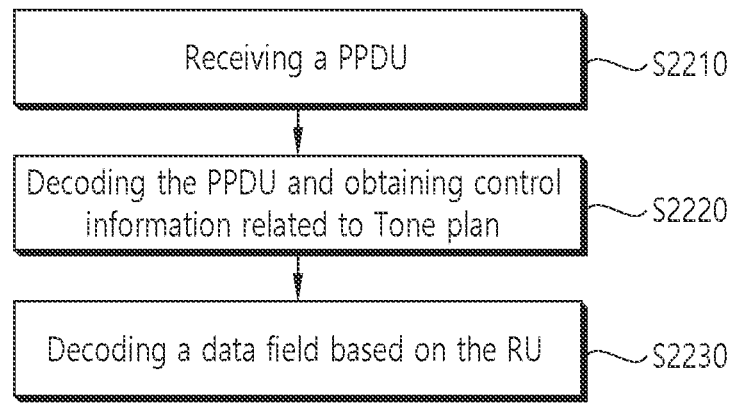
FIG. 22 is a procedural flowchart illustrating an operation of a receiving device according to the present embodiment.

FIG. 22 is a procedural flowchart illustrating an operation of a receiving device according to the present embodiment.

An example of FIG. 22 may be performed by a receiving device (AP and/or non-AP STA).

Each step (or specific sub-step described below) of the example of FIG. 22 may be omitted or changed in part.

In step S2210, the receiving device (receiving STA) may receive the entirety or part of a PPDU. The received signal may have the format of FIG. 19.

The sub-step of the step S2210 may be determined based on the step S2130. That is, the step S2210 may perform an operation of restoring a result of the operations of CSD, spatial mapping, IDFT/IFFT operation, or GI inserting applied in the step S2130.

In the step S2220, the receiving device may perform decoding on the entirety/part of the PPDU. In addition, the receiving device may obtain control information related to a tone plan (i.e., RU/pilot tone) from the decoded PPDU.

More specifically, the receiving device may decode L-SIG and EHT-SIG of the PPDU, based on the legacy STF/LTF, and may obtain information included in the L-SIG and EHT SIG field. Information on various tone plans (i.e., RU/pilot tone) disclosed in the present specification may be included in EHT-SIG (EHT-SIG-A/B/C, etc.), and the receiving STA may obtain information on the tone plan (i.e., RU/pilot tone) through the EHT-SIG.

In step S2230, the receiving device may decode the remaining part of the PPDU, based on the information on the tone plan (i.e., RU) obtained through the step S2220. For example, the receiving STA may decode the STF/LTF field of the PPDU, based on information on one plan (i.e., RU/pilot tone). In addition, the receiving STA may decode a data field of the PPDU, based on the information on the tone plan (i.e., RU/pilot tone), and may obtain an MPDU included in the data field.

In addition, the receiving device may perform a processing operation for transferring the data decoded through the step S2230 to a higher layer (e.g., MAC layer). In addition, when signal generation is instructed from the higher layer to a PHY layer in response to the data transferred to the higher layer, a subsequent operation may be performed.

Hereinafter, the aforementioned embodiment will be described with reference to FIG. 1 to FIG. 22.

Figure 23:
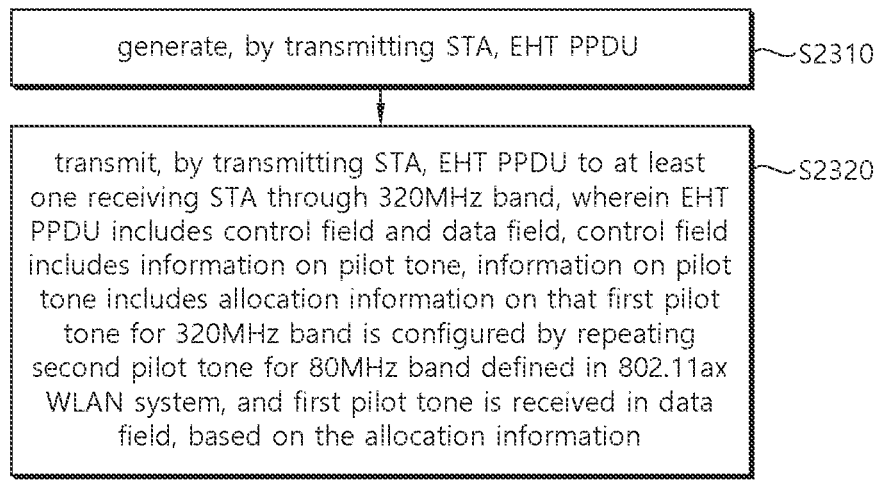
FIG. 23 is a flowchart illustrating a procedure in which a transmitting STA transmits a pilot tone in a wideband EHT PPDU according to the present embodiment.

FIG. 23 is a flowchart illustrating a procedure in which a transmitting STA transmits a pilot tone in a wideband EHT PPDU according to the present embodiment.

The example of FIG. 23 may be performed in a network environment in which a next-generation WLAN system (IEEE 802.11be or EHT WLAN system) is supported. The next-generation WLAN system is a WLAN system evolved from an 802.11ax system, and may satisfy backward compatibility with the 802.11ax system.

The present embodiment proposes a method of configuring a tone plan and pilot tone used to transmit an SU PPDU or an MU PPDU in a wideband (240 MHz, 320 MHz band) supported in the EHT WLAN system.

An example of FIG. 23 may be performed by a transmitting STA, and the transmitting STA may correspond to an AP. A receiving STA of FIG. 23 may correspond to an STA supporting an EHT WLAN system.

In step S2310, the transmitting STA generates an EHT physical protocol data unit (PPDU).

In step S2320, the transmitting STA transmits the EHT PPDU to at least one receiving STA through a 320 MHz band. When the EHT PPDU is transmitted to one receiving STA, the EHT PPDU is the SU PPDU. When the EHT PPDU is transmitted to a plurality of receiving STAs, the EHT PPDU is the MU PPDU.

The EHT PPDU includes a control field and a data field.

The control field includes information on a pilot tone.

The information on the pilot tone includes allocation information on that a first pilot tone for the 320 MHz band is configured by repeating a second pilot tone for an 80 MHz band defined in the 802.11ax WLAN system.

The first pilot tone is received in the data field, based on the allocation information.

Information on the pilot tone includes information on a location of the first pilot tone and the number of the first pilot tones transmitted in the 320 MHz band.

The control field may further include information on the tone plan.

The information on the tone plan includes allocation information on that a tone plan for the 320 MHz band is configured by repeating 4 times a tone plan for an 80 MHz band defined in the 802.11ax WLAN system.

The data field is transmitted through a resource unit (RU) configured based on the allocation information.

The information on the tone plan includes a size and location of the RU, control information related to the RU, information on a frequency band in which the RU is included, and information on an STA which receives the RU, or the like.

That is, the present embodiment proposes a method in which an 80 MHz tone plan defined in the existing 802.11ax is configured repeatedly in a situation where an OFDMA tone plan (SU tone plan) used in an MU PPDU (or SU PPDU) is contiguous/non-contiguous and a method in which a 80 MHz pilot tone defined in the existing 802.11ax is repeatedly configured in a situation where a pilot tone used in the MU PPDU is contiguous/non-contiguous.

When the EHT PPDU is transmitted to a plurality of receiving STAs (in case of MU PPDU), the second tone plan (the tone plan for the 80 MHz band defined in the 802.11ax WLAN system) may be an orthogonal frequency division multiple access (OFDMA) tone plan. The OFDMA tone plan may be configured by combining a 26-tone RU, a 52-tone RU, a 106-tone RU, a 242-tone RU, and a 484-tone RU. The 26-tone RU may be an RU including 26 tones. The 52-tone RU may be an RU including 52 tones. The 106-tone RU may be an RU including 106 tones. The 242-tone RU may be an RU including 242 tones. The 484-tone RU may be an RU including 484 tones.

When the second tone plan is configured by combining the 26-tone RU or the 52-tone RU, a tone index of the second pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}.

When the second tone plan is configured by combining the 106-tone RU, the 242-tone RU, or the 484-tone RU, the second pilot tone may be set to ±{24, 50, 92, 118, 158, 184, 226, 252, 266, 292, 334, 360, 400, 426, 468, 494}.

The 320 MHz band may consist of a contiguous band and a non-contiguous band.

The 320 MHz band may consist of first and second 160 MHz bands, and the first and second 160 MHz bands may be non-contiguous to each other. A location (or tone index) of respective pilot tone, of the first and second 160 MHz bands may be determined based on the second pilot tone. Specifically, a tone index of a third pilot tone for the first and second 160 MHz bands may include an index obtained by adding −512 to a tone index of the second pilot tone and an index obtained by adding +512 to an index of the second pilot tone.

Specifically, when the second tone plan is configured by combining the 26-tone RU or the 52-tone RU, a tone index of a pilot tone for a lower frequency 80 MHz band in the third pilot tone may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}, and a tone index of a pilot tone for a higher frequency 80 MHz band may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}.

When the second tone plan is configured by combining the 106-tone RU, the 242-tone RU, or the 484-tone RU, a tone index of a pilot tone for a lower frequency 80 MHz band in the third pilot tone may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}, and a tone index of a pilot tone for a higher frequency 80 MHz band may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}.

As another example, the 320 MHz band may consist of a contiguous 320 MHz band. A third pilot tone for the contiguous 320 MHz band may include a pilot tone for first to fourth 80 MHz bands. A tone index of a pilot tone for the first 80 MHz band may be an index obtained by adding −1536 to a tone index of the second pilot tone. A tone index of a pilot tone for the second 80 MHz band may be an index obtained by adding −512 to a tone index of the second pilot tone. A tone index of a pilot tone for the third 80 MHz band may be an index obtained by adding −+512 to a tone index of the second pilot tone. A tone index of a pilot tone for the fourth 80 MHz band may be an index obtained by adding −+1536 to a tone index of the second pilot tone. The contiguous 320 MHz band may consist of first to fourth 80 MHz bands in an ascending order of frequency. The first pilot tone (a pilot tone for the 320 MHz band) may consist of a third pilot tone indicated by the tone index.

That is, the third pilot tone may include a pilot tone for the first to fourth 80 MHz bands.

When the second tone plan is configured by combining the 26-tone RU or the 52-tone RU, a tone index of a pilot tone for the first 80 MHz band may be set to −{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}. A tone index of a pilot tone for the second 80 MHz may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the third 80 MHz may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the fourth 80 MHz may be set to +{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the second tone plan is configured by combining the 106-tone RU, the 242-tone RU, or the 484-tone RU, a tone index of a pilot tone for the first 80 MHz may be set to −{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}. A tone index of a pilot tone for the second 80 MHz may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the third 80 MHz may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the fourth 80 MHz may be set to +{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}.

When the EHT PPDU is transmitted to one receiving STA (in case of SU PPDU), the second tone plan (a tone plan for the 80 MHz band defined in the 802.11ax WLAN system) may be configured with a 996-tone RU. The 996-tone RU may be an RU including 996 tones. That is, an SU PPDU for the 320 MHz band may be transmitted based on a tone plan of the 4×996-tone RU. In addition, a tone index of the second pilot tone may be set to ±{24, 92, 158, 226, 266, 334, 400, 468}.

The 320 MHz band may consist of a contiguous band and a non-contiguous band.

For example, the 320 MHz band may consist of a non-contiguous 160+160 MHz band. One 160 MHz band in the non-contiguous 160+160 MHz band may consist of a first 996-tone RU and a second 996-tone RU. In the 160 MHz band, a tone index for the first 996-tone RU may be an index obtained by adding −512 to a tone index of the second pilot tone (a pilot tone for the 80 MHz band defined in the 802.11ax WLAN system). A tone index for the second 996-tone RU may be an index obtained by adding +512 to the tone index of the second pilot tone (a pilot tone for the 80 MHz band defined in the 802.11ax WLAN system).

Accordingly, the tone index of the pilot tone for the first 996-RU tone RU may be set to −{44, 112, 178, 246, 286, 354, 420, 488, 546, 604, 670, 738, 778, 846, 912, 980}. The tone index of the pilot tone for the second 996-RU tone RU may be set to +{44, 112, 178, 246, 286, 354, 420, 488, 546, 604, 670, 738, 778, 846, 912, 980}.

As another example, the 320 MHz band may consist of a contiguous 320 MHz band. A third pilot tone for the contiguous 320 MHz band may include a pilot tone for first to fourth 996-tone RUs. In the contiguous 320 MHz band, a tone index for the first 996-tone RU may be an index obtained by adding −1536 to the tone index of the second pilot tone (a pilot tone for the 80 MHz band defined in the 802.11ax WLAN system). A tone index for the second 996-tone RU may be an index obtained by adding −512 to the tone index of second pilot tone. A tone index for the third 996-tone RU may be an index obtained by adding +512 to the second pilot tone. A tone index for the fourth 996-tone RU may be an index obtained by adding +1536 to the tone index of the second pilot tone. The contiguous 320 MHz band may consist of the first to fourth 996-tone RUs in an ascending order of frequency. The first pilot tone (a pilot tone for the 320 MHz band) may consist of a third pilot tone indicated by the tone index.

That is, the third pilot tone may include a pilot tone for the first to fourth 996-tone RUs. A tone index of a pilot tone for the first 996-tone RU may be set to −{1068, 1136, 1202, 1270, 1310, 1378, 1444, 1512, 1560, 1628, 1694, 1762, 1802, 1870, 1936, 2004}. A tone index of a pilot tone for the second 996-tone RU may be set to −{44, 112, 178, 246, 286, 354, 420, 488, 546, 604, 670, 738, 778, 846, 912, 980}. A tone index of a pilot tone for the third 996-tone RU may be set to +{44, 112, 178, 246, 286, 354, 420, 488, 546, 604, 670, 738, 778, 846, 912, 980}. A tone index of a pilot tone for the fourth 996-tone RU may be set to +{1068, 1136, 1202, 1270, 1310, 1378, 1444, 1512, 1560, 1628, 1694, 1762, 1802, 1870, 1936, 2004}.

In addition, the receiving STA may decode the control field. The control field may include a universal-signal (U-SIG) and an extremely high throughput-signal (EHT-SIG). The information on the bandwidth may be included in a version independent field of the U-SIG.

The receiving STA may obtain information on a size of a band in which the EHT PPDU is transmitted based on the control field. The receiving STA may obtain the OFDMA tone plan, information on an RU in which the data field is received, and information the pilot tone, based on the EHT-SIG. That is, the receiving STA may decode the U-SIG to identify the size of the band in which the EHT PPDU is transmitted, and may decode the EHT-SIG to identify a location (or tone index) of the pilot tone.

In addition, the transmitting STA may transmit the EHT PPDU through the 240 MHz band. In this case, the information on the pilot tone may further include allocation information on that a fourth pilot tone for the 240 MHz is configured by repeating the second pilot tone. In addition, the information on the tone plan may include allocation information on that a third tone plan for the 240 MHz is configured by repeating three times the second tone plan.

When the EHT PPDU is transmitted to a plurality of receiving STAs (in case of MU PPDU), the second tone plan may be an OFDMA tone plan. The OFDMA tone plan may be configured by combining a 26-tone RU, a 52-tone RU, a 106-tone RU, a 242-tone RU, and a 484-tone RU. Likewise, the 240 MHz band may consist of a non-contiguous 160+80 MHz (or 80+160 MHz) band, or may consist of a contiguous 240 MHz band.

The 240 MHz band may consist of a contiguous band and a non-contiguous band as follows.

For example, the 240 MHz band may consist of a non-contiguous 160+80 MHz (or 80+160 MHz) band. Accordingly, the fourth pilot tone for the 240 MHz band may include a pilot tone for the 160 MHz band and a pilot tone for the 80 MHz band.

A tone index of a pilot tone for the 160 MHz bands may include an index obtained by adding −512 to a tone index of the second pilot tone and an index obtained by adding +512 to an index of the second pilot tone. A tone index of a pilot tone for the first 80 MHz band may include a tone index of the second pilot tone.

When the EHT PPDU is transmitted to one receiving STA (in case of SU PPDU), the second tone plan may be configured with a 996-tone RU. The 996-tone RU may be an RU including 996 tones. That is, an SU PPDU for the 240 MHz band may be transmitted based on a tone plan of the 3×996-tone RU.

The 240 MHz band may consist of a contiguous band and a non-contiguous band as follows.

For example, the 240 MHz band may consist of a non-contiguous 160+80 MHz (or 80+160 MHz) band. In the non-contiguous 160+80 MHz (or 80+160 MHz) band, the 160 MHz band may consist of a first 996-tone RU and a second 996-tone RU. The remaining 80 MHz band may consist of a third 996-tone RU. A pilot tone for the first 996-tone RU may use an index obtained by adding −512 to a tone index of the second pilot tone (a pilot tone for the 80 MHz band defined in the 802.11ax WLAN system). A pilot tone for the second 996-tone RU may use an index obtained by adding +512 to the tone index of the second pilot tone. A pilot tone for the third 996-tone RU may directly use a tone index of the second pilot tone. The fourth pilot tone may consist of a pilot tone for first and second 996-tone RUs for the 160 MHz band indicated by the tone index and a pilot tone for the third 996-tone RU for the 80 MHz band.

As another example, the 240 MHz band may consist of a contiguous 240 MHz band. The contiguous 240 MHz band may consist of first to third 996-tone RUs. In the contiguous 240 MHz band, a tone index of the pilot tone for the first 996-tone RU may be an index obtained by adding −1024 to the tone index of the second pilot tone (a pilot tone for the 80 MHz band defined in the 802.11ax WLAN system). A tone index of the pilot tone for the second 996-tone RU may directly use a tone index of the second pilot tone. A tone index of the pilot tone for the third 996-tone RU may be obtained by adding +1024 to the tone index of the second pilot tone. The fourth pilot tone may consist of a pilot tone for first to third 996-tone RUs indicated by the tone index.

Figure 24:
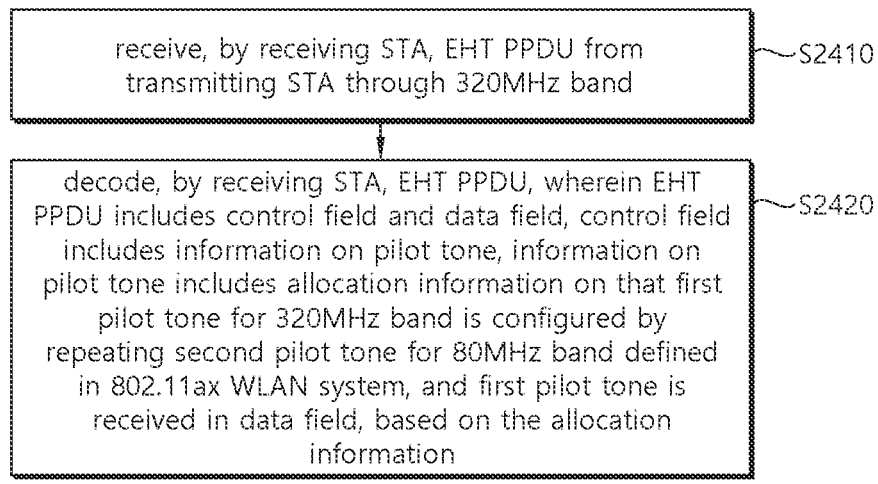
FIG. 24 is a flowchart illustrating a procedure in which a receiving STA receives a pilot tone in a wideband EHT PPDU according to the present embodiment.

FIG. 24 is a flowchart illustrating a procedure in which a receiving STA receives a pilot tone in a wideband EHT PPDU according to the present embodiment.

The example of FIG. 24 may be performed in a network environment in which a next-generation WLAN system (IEEE 802.11be or EHT WLAN system) is supported. The next-generation WLAN system is a WLAN system evolved from an 802.11ax system, and may satisfy backward compatibility with the 802.11ax system.

The present embodiment proposes a method of configuring a tone plan and pilot tone used to transmit an SU PPDU or an MU PPDU in a wideband (240 MHz, 320 MHz band) supported in the EHT WLAN system.

An example of FIG. 24 may be performed in a receiving STA, and the receiving STA may corresponding to an STA supporting an EHT WLAN system. A transmitting STA of FIG. 24 may correspond to an access point (AP).

In step S2410, the receiving STA receives an EHT PPDU from the transmitting STA through a 320 MHz band.

In step S2420, the receiving STA decodes the EHT PPDU.

When the EHT PPDU is transmitted to one receiving STA, the EHT PPDU is the SU PPDU. When the EHT PPDU is transmitted to a plurality of receiving STAs, the EHT PPDU is the MU PPDU.

The EHT PPDU includes a control field and a data field.

The control field includes information on a pilot tone.

The information on the pilot tone includes allocation information on that a first pilot tone for the 320 MHz band is configured by repeating a second pilot tone for an 80 MHz band defined in the 802.11ax WLAN system.

The first pilot tone is received in the data field, based on the allocation information.

Information on the pilot tone includes information on a location of the first pilot tone and the number of the first pilot tones transmitted in the 320 MHz band.

The control field may further include information on the tone plan.

The information on the tone plan includes allocation information on that a tone plan for the 320 MHz band is configured by repeating 4 times a tone plan for an 80 MHz band defined in the 802.11ax WLAN system.

The data field is transmitted through a resource unit (RU) configured based on the allocation information.

The information on the tone plan includes a size and location of the RU, control information related to the RU, information on a frequency band in which the RU is included, and information on an STA which receives the RU, or the like.

That is, the present embodiment proposes a method in which an 80 MHz tone plan defined in the existing 802.11ax is configured repeatedly in a situation where an OFDMA tone plan (SU tone plan) used in an MU PPDU (or SU PPDU) is contiguous/non-contiguous and a method in which a 80 MHz pilot tone defined in the existing 802.11ax is repeatedly configured in a situation where a pilot tone used in the MU PPDU is contiguous/non-contiguous.

When the EHT PPDU is transmitted to a plurality of receiving STAs (in case of MU PPDU), the second tone plan (the tone plan for the 80 MHz band defined in the 802.11ax WLAN system) may be an orthogonal frequency division multiple access (OFDMA) tone plan. The OFDMA tone plan may be configured by combining a 26-tone RU, a 52-tone RU, a 106-tone RU, a 242-tone RU, and a 484-tone RU. The 26-tone RU may be an RU including 26 tones. The 52-tone RU may be an RU including 52 tones. The 106-tone RU may be an RU including 106 tones. The 242-tone RU may be an RU including 242 tones. The 484-tone RU may be an RU including 484 tones.

When the second tone plan is configured by combining the 26-tone RU or the 52-tone RU, a tone index of the second pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}.

When the second tone plan is configured by combining the 106-tone RU, the 242-tone RU, or the 484-tone RU, the second pilot tone may be set to ±{24, 50, 92, 118, 158, 184, 226, 252, 266, 292, 334, 360, 400, 426, 468, 494}.

The 320 MHz band may consist of a contiguous band and a non-contiguous band.

The 320 MHz band may consist of first and second 160 MHz bands, and the first and second 160 MHz bands may be non-contiguous to each other. A location (or tone index) of respective pilot tones of the first and second 160 MHz bands may be determined based on the second pilot tone. Specifically, a tone index of a third pilot tone for the first and second 160 MHz bands may include an index obtained by adding −512 to a tone index of the second pilot tone and an index obtained by adding +512 to an index of the second pilot tone.

Specifically, when the second tone plan is configured by combining the 26-tone RU or the 52-tone RU, a tone index of a pilot tone for a lower frequency 80 MHz band in the third pilot tone may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}, and a tone index of a pilot tone for a higher frequency 80 MHz band may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}.

When the second tone plan is configured by combining the 106-tone RU, the 242-tone RU, or the 484-tone RU, a tone index of a pilot tone for a lower frequency 80 MHz band in the third pilot tone may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}, and a tone index of a pilot tone for a higher frequency 80 MHz band may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}.

As another example, the 320 MHz band may consist of a contiguous 320 MHz band. A third pilot tone for the contiguous 320 MHz band may include a pilot tone for first to fourth 80 MHz bands. A tone index of a pilot tone for the first 80 MHz band may be an index obtained by adding −1536 to a tone index of the second pilot tone. A tone index of a pilot tone for the second 80 MHz band may be an index obtained by adding −512 to a tone index of the second pilot tone. A tone index of a pilot tone for the third 80 MHz band may be an index obtained by adding −+512 to a tone index of the second pilot tone. A tone index of a pilot tone for the fourth 80 MHz band may be an index obtained by adding −+1536 to a tone index of the second pilot tone. The contiguous 320 MHz band may consist of first to fourth 80 MHz bands in an ascending order of frequency. The first pilot tone (a pilot tone for the 320 MHz band) may consist of a third pilot tone indicated by the tone index.

That is, the third pilot tone may include a pilot tone for the first to fourth 80 MHz bands.

When the second tone plan is configured by combining the 26-tone RU or the 52-tone RU, a tone index of a pilot tone for the first 80 MHz band may be set to −{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}. A tone index of a pilot tone for the second 80 MHz may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the third 80 MHz may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the fourth 80 MHz may be set to +{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the second tone plan is configured by combining the 106-tone RU, the 242-tone RU, or the 484-tone RU, a tone index of a pilot tone for the first 80 MHz band may be set to −{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}. A tone index of a pilot tone for the second 80 MHz may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the third 80 MHz may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the fourth 80 MHz may be set to +{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}.

When the EHT PPDU is transmitted to one receiving STA (in case of SU PPDU), the second tone plan (a tone plan for the 80 MHz band defined in the 802.11ax WLAN system) may be configured with a 996-tone RU. The 996-tone RU may be an RU including 996 tones. That is, an SU PPDU for the 320 MHz band may be transmitted based on a tone plan of the 4×996-tone RU. In addition, a tone index of the second pilot tone may be set to ±{24, 92, 158, 226, 266, 334, 400, 468}.

The 320 MHz band may consist of a contiguous band and a non-contiguous band.

For example, the 320 MHz band may consist of a non-contiguous 160+160 MHz band. One 160 MHz band in the non-contiguous 160+160 MHz band may consist of a first 996-tone RU and a second 996-tone RU. In the 160 MHz band, a tone index for the first 996-tone RU may be an index obtained by adding −512 to a tone index of the second pilot tone (a pilot tone for the 80 MHz band defined in the 802.11ax WLAN system). A tone index for the second 996-tone RU may be an index obtained by adding +512 to the tone index of the second pilot tone (a pilot tone for the 80 MHz band defined in the 802.11ax WLAN system).

Accordingly, the tone index of the pilot tone for the first 996-RU tone RU may be set to −{44, 112, 178, 246, 286, 354, 420, 488, 546, 604, 670, 738, 778, 846, 912, 980}. The tone index of the pilot tone for the second 996-RU tone RU may be set to +{44, 112, 178, 246, 286, 354, 420, 488, 546, 604, 670, 738, 778, 846, 912, 980}.

As another example, the 320 MHz band may consist of a contiguous 320 MHz band. A third pilot tone for the contiguous 320 MHz band may include a pilot tone for first to fourth 996-tone RUs. In the contiguous 320 MHz band, a tone index for the first 996-tone RU may be an index obtained by adding −1536 to the tone index of the second pilot tone (a pilot tone for the 80 MHz band defined in the 802.11ax WLAN system). A tone index for the second 996-tone RU may be an index obtained by adding −512 to the tone index of second pilot tone. A tone index for the third 996-tone RU may be an index obtained by adding +512 to the second pilot tone. A tone index for the fourth 996-tone RU may be an index obtained by adding +1536 to the tone index of the second pilot tone. The contiguous 320 MHz band may consist of the first to fourth 996-tone RUs in an ascending order of frequency. The first pilot tone (a pilot tone for the 320 MHz band) may consist of a third pilot tone indicated by the tone index.

That is, the third pilot tone may include a pilot tone for the first to fourth 996-tone RUs. A tone index of a pilot tone for the first 996-tone RU may be set to −{1068, 1136, 1202, 1270, 1310, 1378, 1444, 1512, 1560, 1628, 1694, 1762, 1802, 1870, 1936, 2004}. A tone index of a pilot tone for the second 996-tone RU may be set to −{44, 112, 178, 246, 286, 354, 420, 488, 546, 604, 670, 738, 778, 846, 912, 980}. A tone index of a pilot tone for the third 996-tone RU may be set to +{44, 112, 178, 246, 286, 354, 420, 488, 546, 604, 670, 738, 778, 846, 912, 980}. A tone index of a pilot tone for the fourth 996-tone RU may be set to +{1068, 1136, 1202, 1270, 1310, 1378, 1444, 1512, 1560, 1628, 1694, 1762, 1802, 1870, 1936, 2004}.

In addition, the receiving STA may decode the control field. The control field may include a universal-signal (U-SIG) and an extremely high throughput-signal (EHT-SIG). The information on the bandwidth may be included in a version independent field of the U-SIG.

The receiving STA may obtain information on a size of a band in which the EHT PPDU is transmitted based on the control field. The receiving STA may obtain the OFDMA tone plan, information on an RU in which the data field is received, and information the pilot tone, based on the EHT-SIG. That is, the receiving STA may decode the U-SIG to identify the size of the band in which the EHT PPDU is transmitted, and may decode the EHT-SIG to identify a location (or tone index) of the pilot tone.

In addition, the transmitting STA may transmit the EHT PPDU through the 240 MHz band. In this case, the information on the pilot tone may further include allocation information on that a fourth pilot tone for the 240 MHz is configured by repeating the second pilot tone. In addition, the information on the tone plan may include allocation information on that a third tone plan for the 240 MHz is configured by repeating three times the second tone plan.

When the EHT PPDU is transmitted to a plurality of receiving STAs (in case of MU PPDU), the second tone plan may be an OFDMA tone plan. The OFDMA tone plan may be configured by combining a 26-tone RU, a 52-tone RU, a 106-tone RU, a 242-tone RU, and a 484-tone RU. Likewise, the 240 MHz band may consist of a non-contiguous 160+80 MHz (or 80+160 MHz) band, or may consist of a contiguous 240 MHz band.

The 240 MHz band may consist of a contiguous band and a non-contiguous band as follows.

For example, the 240 MHz band may consist of a non-contiguous 160+80 MHz (or 80+160 MHz) band. Accordingly, the fourth pilot tone for the 240 MHz band may include a pilot tone for the 160 MHz band and a pilot tone for the 80 MHz band.

A tone index of a pilot tone for the 160 MHz bands may include an index obtained by adding −512 to a tone index of the second pilot tone and an index obtained by adding +512 to an index of the second pilot tone A tone index of a pilot tone for the first 80 MHz band may include a tone index of the second pilot tone.

When the EHT PPDU is transmitted to one receiving STA (in case of SU PPDU), the second tone plan may be configured with a 996-tone RU. The 996-tone RU may be an RU including 996 tones. That is, an SU PPDU for the 240 MHz band may be transmitted based on a tone plan of the 3×996-tone RU.

The 240 MHz band may consist of a contiguous band and a non-contiguous band as follows.

For example, the 240 MHz band may consist of a non-contiguous 160+80 MHz (or 80+160 MHz) band. In the non-contiguous 160+80 MHz (or 80+160 MHz) band, the 160 MHz band may consist of a first 996-tone RU and a second 996-tone RU. The remaining 80 MHz band may consist of a third 996-tone RU. A pilot tone for the first 996-tone RU may use an index obtained by adding −512 to a tone index of the second pilot tone (a pilot tone for the 80 MHz band defined in the 802.11ax WLAN system). A pilot tone for the second 996-tone RU may use an index obtained by adding +512 to the tone index of the second pilot tone. A pilot tone for the third 996-tone RU may directly use a tone index of the second pilot tone. The fourth pilot tone may consist of a pilot tone for first and second 996-tone RUs for the 160 MHz band indicated by the tone index and a pilot tone for the third 996-tone RU for the 80 MHz band.

As another example, the 240 MHz band may consist of a contiguous 240 MHz band. The contiguous 240 MHz band may consist of first to third 996-tone RUs. In the contiguous 240 MHz band, a tone index of the pilot tone for the first 996-tone RU may be an index obtained by adding −1024 to the tone index of the second pilot tone (a pilot tone for the 80 MHz band defined in the 802.11ax WLAN system). A tone index of the pilot tone for the second 996-tone RU may directly use a tone index of the second pilot tone. A tone index of the pilot tone for the third 996-tone RU may be obtained by adding +1024 to the tone index of the second pilot tone. The fourth pilot tone may consist of a pilot tone for first to third 996-tone RUs indicated by the tone index.

4. Device Configuration

Figure 25:
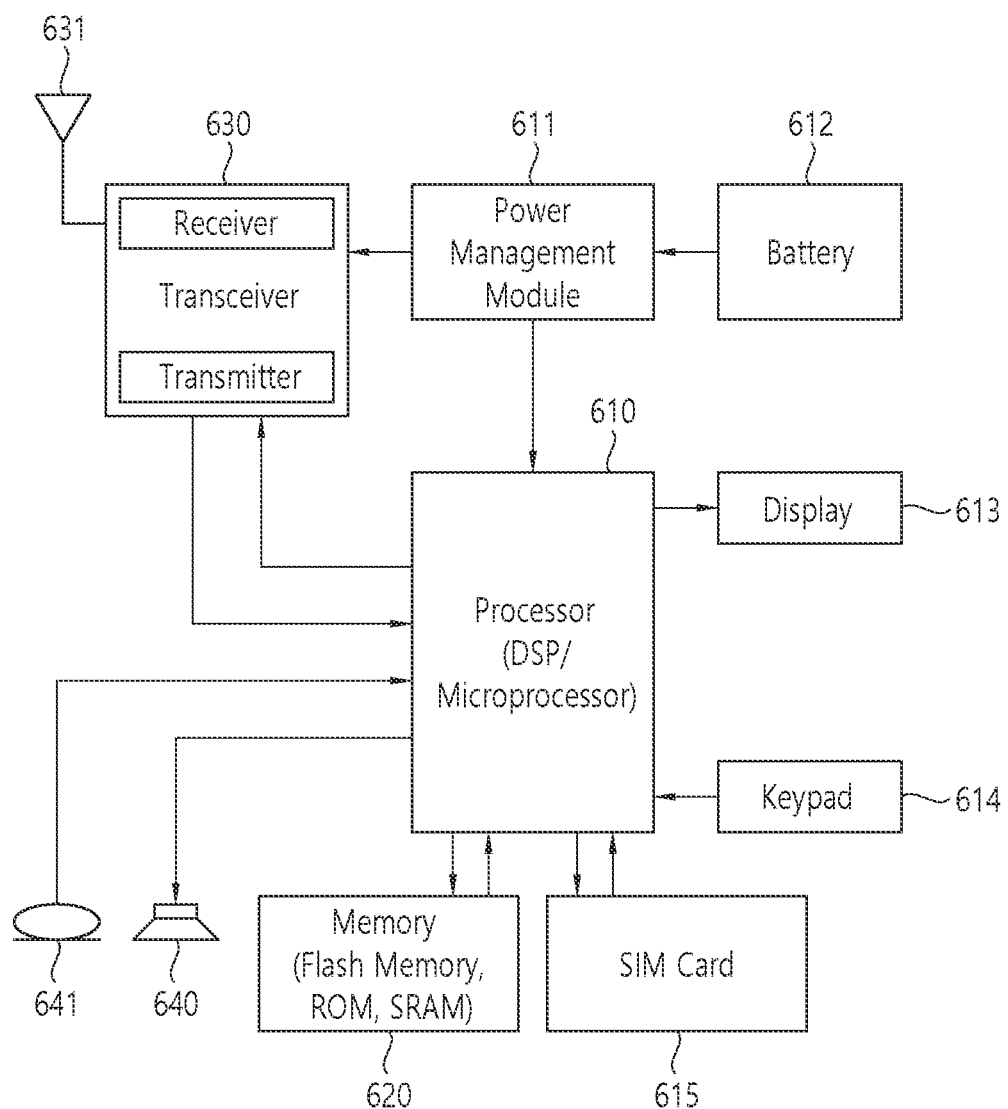
FIG. 25 illustrates an example of a modified transmitting device and/or receiving device of the present specification.

FIG. 25 illustrates an example of a modified transmitting device and/or receiving device of the present specification.

Each device/STA of the sub-figure (a)/(b) of FIG. 1 may be modified as shown in FIG. 25. A transceiver 630 of FIG. 25 may be identical to the transceivers 113 and 123 of FIG. 1. The transceiver 630 of FIG. 25 may include a receiver and a transmitter.

A processor 610 of FIG. 25 may be identical to the processors 111 and 121 of FIG. 1. Alternatively, the processor 610 of FIG. 25 may be identical to the processing chips 114 and 124 of FIG. 1.

A memory 620 of FIG. 25 may be identical to the memories 112 and 122 of FIG. 1. Alternatively, the memory 620 of FIG. 25 may be a separate external memory different from the memories 112 and 122 of FIG. 1.

Referring to FIG. 25, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 25, a speaker 640 may output a result related to a sound processed by the processor 610. A microphone 641 may receive an input related to a sound to be used by the processor 610.

The aforementioned technical feature of the present specification may be applied to various apparatuses and methods. For example, the aforementioned technical feature of the present specification may be performed/supported through the apparatus of FIG. 1 and/or FIG. 25. For example, the aforementioned technical feature of the present specification may be applied only to part of FIG. 1 and/or FIG. 25. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 25. For example, the apparatus of the present specification is an apparatus for receiving an EHT PPDU, based on a tone plan. The apparatus includes a memory and a processor operatively coupled to the memory. The processor receives an extremely high throughput (EHT) physical protocol data unit (PPDU) from a transmitting STA through a 320 MHz band, and decodes the EHT PPDU.

When the EHT PPDU is transmitted to one receiving STA, the EHT PPDU is the SU PPDU. When the EHT PPDU is transmitted to a plurality of receiving STAs, the EHT PPDU is the MU PPDU.

The EHT PPDU includes a control field and a data field. The control field includes information on a pilot tone.

The information on the pilot tone includes allocation information on that a first pilot tone for the 320 MHz band is configured by repeating a second pilot tone for an 80 MHz band defined in the 802.11ax WLAN system.

The first pilot tone is received in the data field, based on the allocation information.

Information on the pilot tone includes information on a location of the first pilot tone and the number of the first pilot tones transmitted in the 320 MHz band.

The control field may further include information on the tone plan.

The information on the tone plan includes allocation information on that a tone plan for the 320 MHz band is configured by repeating 4 times a tone plan for an 80 MHz band defined in the 802.11ax WLAN system.

The data field is transmitted through a resource unit (RU) configured based on the allocation information.

The information on the tone plan includes a size and location of the RU, control information related to the RU, information on a frequency band in which the RU is included, and information on an STA which receives the RU, or the like.

That is, the present embodiment proposes a method in which an 80 MHz tone plan defined in the existing 802.11ax is configured repeatedly in a situation where an OFDMA tone plan (SU tone plan) used in an MU PPDU (or SU PPDU) is contiguous/non-contiguous and a method in which a 80 MHz pilot tone defined in the existing 802.11ax is repeatedly configured in a situation where a pilot tone used in the MU PPDU is contiguous/non-contiguous.

When the EHT PPDU is transmitted to a plurality of receiving STAs (in case of MU PPDU), the second tone plan (the tone plan for the 80 MHz band defined in the 802.11ax WLAN system) may be an orthogonal frequency division multiple access (OFDMA) tone plan. The OFDMA tone plan may be configured by combining a 26-tone RU, a 52-tone RU, a 106-tone RU, a 242-tone RU, and a 484-tone RU. The 26-tone RU may be an RU including 26 tones. The 52-tone RU may be an RU including 52 tones. The 106-tone RU may be an RU including 106 tones. The 242-tone RU may be an RU including 242 tones. The 484-tone RU may be an RU including 484 tones.

When the second tone plan is configured by combining the 26-tone RU or the 52-tone RU, a tone index of the second pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}.

When the second tone plan is configured by combining the 106-tone RU, the 242-tone RU, or the 484-tone RU, the second pilot tone may be set to ±{24, 50, 92, 118, 158, 184, 226, 252, 266, 292, 334, 360, 400, 426, 468, 494}.

The 320 MHz band may consist of a contiguous band and a non-contiguous band.

The 320 MHz band may consist of first and second 160 MHz bands, and the first and second 160 MHz bands may be non-contiguous to each other. A location (or tone index) of respective pilot tone, of the first and second 160 MHz bands may be determined based on the second pilot tone. Specifically, a tone index of a third pilot tone for the first and second 160 MHz bands may include an index obtained by adding −512 to a tone index of the second pilot tone and an index obtained by adding +512 to an index of the second pilot tone.

Specifically, when the second tone plan is configured by combining the 26-tone RU or the 52-tone RU, a tone index of a pilot tone for a lower frequency 80 MHz band in the third pilot tone may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}, and a tone index of a pilot tone for a higher frequency 80 MHz band may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}.

When the second tone plan is configured by combining the 106-tone RU, the 242-tone RU, or the 484-tone RU, a tone index of a pilot tone for a lower frequency 80 MHz band in the third pilot tone may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}, and a tone index of a pilot tone for a higher frequency 80 MHz band may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}.

As another example, the 320 MHz band may consist of a contiguous 320 MHz band. A third pilot tone for the contiguous 320 MHz band may include a pilot tone for first to fourth 80 MHz bands. A tone index of a pilot tone for the first 80 MHz band may be an index obtained by adding −1536 to a tone index of the second pilot tone. A tone index of a pilot tone for the second 80 MHz band may be an index obtained by adding −512 to a tone index of the second pilot tone. A tone index of a pilot tone for the third 80 MHz band may be an index obtained by adding −+512 to a tone index of the second pilot tone. A tone index of a pilot tone for the fourth 80 MHz band may be an index obtained by adding −+1536 to a tone index of the second pilot tone. The contiguous 320 MHz band may consist of first to fourth 80 MHz bands in an ascending order of frequency. The first pilot tone (a pilot tone for the 320 MHz band) may consist of a third pilot tone indicated by the tone index.

That is, the third pilot tone may include a pilot tone for the first to fourth 80 MHz bands.

When the second tone plan is configured by combining the 26-tone RU or the 52-tone RU, a tone index of a pilot tone for the first 80 MHz band may be set to −{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}. A tone index of a pilot tone for the second 80 MHz may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the third 80 MHz may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the fourth 80 MHz may be set to +{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the second tone plan is configured by combining the 106-tone RU, the 242-tone RU, or the 484-tone RU, a tone index of a pilot tone for the first 80 MHz may be set to −{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}. A tone index of a pilot tone for the second 80 MHz may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the third 80 MHz may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the fourth 80 MHz may be set to +{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}.

When the EHT PPDU is transmitted to one receiving STA (in case of SU PPDU), the second tone plan (a tone plan for the 80 MHz band defined in the 802.11ax WLAN system) may be configured with a 996-tone RU. The 996-tone RU may be an RU including 996 tones. That is, an SU PPDU for the 320 MHz band may be transmitted based on a tone plan of the 4×996-tone RU. In addition, a tone index of the second pilot tone may be set to ±{24, 92, 158, 226, 266, 334, 400, 468}.

The 320 MHz band may consist of a contiguous band and a non-contiguous band.

For example, the 320 MHz band may consist of a non-contiguous 160+160 MHz band. One 160 MHz band in the non-contiguous 160+160 MHz band may consist of a first 996-tone RU and a second 996-tone RU. In the 160 MHz band, a tone index for the first 996-tone RU may be an index obtained by adding −512 to a tone index of the second pilot tone (a pilot tone for the 80 MHz band defined in the 802.11ax WLAN system). A tone index for the second 996-tone RU may be an index obtained by adding +512 to the tone index of the second pilot tone (a pilot tone for the 80 MHz band defined in the 802.11ax WLAN system).

Accordingly, the tone index of the pilot tone for the first 996-RU tone RU may be set to −{44, 112, 178, 246, 286, 354, 420, 488, 546, 604, 670, 738, 778, 846, 912, 980}. The tone index of the pilot tone for the second 996-RU tone RU may be set to +{44, 112, 178, 246, 286, 354, 420, 488, 546, 604, 670, 738, 778, 846, 912, 980}.

As another example, the 320 MHz band may consist of a contiguous 320 MHz band. A third pilot tone for the contiguous 320 MHz band may include a pilot tone for first to fourth 996-tone RUs. In the contiguous 320 MHz band, a tone index for the first 996-tone RU may be an index obtained by adding −1536 to the tone index of the second pilot tone (a pilot tone for the 80 MHz band defined in the 802.11ax WLAN system). A tone index for the second 996-tone RU may be an index obtained by adding −512 to the tone index of second pilot tone. A tone index for the third 996-tone RU may be an index obtained by adding +512 to the second pilot tone. A tone index for the fourth 996-tone RU may be an index obtained by adding +1536 to the tone index of the second pilot tone. The contiguous 320 MHz band may consist of the first to fourth 996-tone RUs in an ascending order of frequency. The first pilot tone (a pilot tone for the 320 MHz band) may consist of a third pilot tone indicated by the tone index.

That is, the third pilot tone may include a pilot tone for the first to fourth 996-tone RUs. A tone index of a pilot tone for the first 996-tone RU may be set to −{1068, 1136, 1202, 1270, 1310, 1378, 1444, 1512, 1560, 1628, 1694, 1762, 1802, 1870, 1936, 2004}. A tone index of a pilot tone for the second 996-tone RU may be set to −{44, 112, 178, 246, 286, 354, 420, 488, 546, 604, 670, 738, 778, 846, 912, 980}. A tone index of a pilot tone for the third 996-tone RU may be set to +{44, 112, 178, 246, 286, 354, 420, 488, 546, 604, 670, 738, 778, 846, 912, 980}. A tone index of a pilot tone for the fourth 996-tone RU may be set to +{1068, 1136, 1202, 1270, 1310, 1378, 1444, 1512, 1560, 1628, 1694, 1762, 1802, 1870, 1936, 2004}.

In addition, the receiving STA may decode the control field. The control field may include a universal-signal (U-SIG) and an extremely high throughput-signal (EHT-SIG). The information on the bandwidth may be included in a version independent field of the U-SIG.

The receiving STA may obtain information on a size of a band in which the EHT PPDU is transmitted based on the control field. The receiving STA may obtain the OFDMA tone plan, information on an RU in which the data field is received, and information the pilot tone, based on the EHT-SIG. That is, the receiving STA may decode the U-SIG to identify the size of the band in which the EHT PPDU is transmitted, and may decode the EHT-SIG to identify a location (or tone index) of the pilot tone.

In addition, the transmitting STA may transmit the EHT PPDU through the 240 MHz band. In this case, the information on the pilot tone may further include allocation information on that a fourth pilot tone for the 240 MHz is configured by repeating the second pilot tone. In addition, the information on the tone plan may include allocation information on that a third tone plan for the 240 MHz is configured by repeating three times the second tone plan.

When the EHT PPDU is transmitted to a plurality of receiving STAs (in case of MU PPDU), the second tone plan may be an OFDMA tone plan. The OFDMA tone plan may be configured by combining a 26-tone RU, a 52-tone RU, a 106-tone RU, a 242-tone RU, and a 484-tone RU. Likewise, the 240 MHz band may consist of a non-contiguous 160+80 MHz (or 80+160 MHz) band, or may consist of a contiguous 240 MHz band.

The 240 MHz band may consist of a contiguous band and a non-contiguous band as follows.

For example, the 240 MHz band may consist of a non-contiguous 160+80 MHz (or 80+160 MHz) band. Accordingly, the fourth pilot tone for the 240 MHz band may include a pilot tone for the 160 MHz band and a pilot tone for the 80 MHz band.

A tone index of a pilot tone for the 160 MHz bands may include an index obtained by adding −512 to a tone index of the second pilot tone and an index obtained by adding +512 to an index of the second pilot tone. A tone index of a pilot tone for the first 80 MHz band may include a tone index of the second pilot tone.

When the EHT PPDU is transmitted to one receiving STA (in case of SU PPDU), the second tone plan may be configured with a 996-tone RU. The 996-tone RU may be an RU including 996 tones. That is, an SU PPDU for the 240 MHz band may be transmitted based on a tone plan of the 3×996-tone RU.

The 240 MHz band may consist of a contiguous band and a non-contiguous band as follows.

For example, the 240 MHz band may consist of a non-contiguous 160+80 MHz (or 80+160 MHz) band. In the non-contiguous 160+80 MHz (or 80+160 MHz) band, the 160 MHz band may consist of a first 996-tone RU and a second 996-tone RU. The remaining 80 MHz band may consist of a third 996-tone RU. A pilot tone for the first 996-tone RU may use an index obtained by adding −512 to a tone index of the second pilot tone (a pilot tone for the 80 MHz band defined in the 802.11ax WLAN system). A pilot tone for the second 996-tone RU may use an index obtained by adding +512 to the tone index of the second pilot tone. A pilot tone for the third 996-tone RU may directly use a tone index of the second pilot tone. The fourth pilot tone may consist of a pilot tone for first and second 996-tone RUs for the 160 MHz band indicated by the tone index and a pilot tone for the third 996-tone RU for the 80 MHz band.

As another example, the 240 MHz band may consist of a contiguous 240 MHz band. The contiguous 240 MHz band may consist of first to third 996-tone RUs. In the contiguous 240 MHz band, a tone index of the pilot tone for the first 996-tone RU may be an index obtained by adding −1024 to the tone index of the second pilot tone (a pilot tone for the 80 MHz band defined in the 802.11ax WLAN system). A tone index of the pilot tone for the second 996-tone RU may directly use a tone index of the second pilot tone. A tone index of the pilot tone for the third 996-tone RU may be obtained by adding +1024 to the tone index of the second pilot tone. The fourth pilot tone may consist of a pilot tone for first to third 996-tone RUs indicated by the tone index.

The technical feature of the present specification may be implemented based on a computer readable medium (CRM). For example, the CRM proposed by the present specification is at least one computer readable medium including an instruction executed by at least one processor.

The CRM may store instructions performing operations of: receiving an extremely high throughput (EHT) physical protocol data unit (PPDU) from a transmitting STA through a 320 MHz band; and decoding the EHT PPDU. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 25. Meanwhile, the CRM of the present specification may be the memories 112 and 122 of FIG. 1 or the memory 620 of FIG. 25 or a separate external memory/storage medium/disk or the like.

When the EHT PPDU is transmitted to one receiving STA, the EHT PPDU is the SU PPDU. When the EHT PPDU is transmitted to a plurality of receiving STAs, the EHT PPDU is the MU PPDU.

The EHT PPDU includes a control field and a data field.

The control field includes information on a pilot tone.

The information on the pilot tone includes allocation information on that a first pilot tone for the 320 MHz band is configured by repeating a second pilot tone for an 80 MHz band defined in the 802.11ax WLAN system.

The first pilot tone is received in the data field, based on the allocation information.

Information on the pilot tone includes information on a location of the first pilot tone and the number of the first pilot tones transmitted in the 320 MHz band.

The control field may further include information on the tone plan.

The information on the tone plan includes allocation information on that a tone plan for the 320 MHz band is configured by repeating 4 times a tone plan for an 80 MHz band defined in the 802.11ax WLAN system.

The data field is transmitted through a resource unit (RU) configured based on the allocation information.

The information on the tone plan includes a size and location of the RU, control information related to the RU, information on a frequency band in which the RU is included, and information on an STA which receives the RU, or the like.

That is, the present embodiment proposes a method in which an 80 MHz tone plan defined in the existing 802.11ax is configured repeatedly in a situation where an OFDMA tone plan (SU tone plan) used in an MU PPDU (or SU PPDU) is contiguous/non-contiguous and a method in which a 80 MHz pilot tone defined in the existing 802.11ax is repeatedly configured in a situation where a pilot tone used in the MU PPDU is contiguous/non-contiguous.

When the EHT PPDU is transmitted to a plurality of receiving STAs (in case of MU PPDU), the second tone plan (the tone plan for the 80 MHz band defined in the 802.11ax WLAN system) may be an orthogonal frequency division multiple access (OFDMA) tone plan. The OFDMA tone plan may be configured by combining a 26-tone RU, a 52-tone RU, a 106-tone RU, a 242-tone RU, and a 484-tone RU. The 26-tone RU may be an RU including 26 tones. The 52-tone RU may be an RU including 52 tones. The 106-tone RU may be an RU including 106 tones. The 242-tone RU may be an RU including 242 tones. The 484-tone RU may be an RU including 484 tones.

When the second tone plan is configured by combining the 26-tone RU or the 52-tone RU, a tone index of the second pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}.

When the second tone plan is configured by combining the 106-tone RU, the 242-tone RU, or the 484-tone RU, the second pilot tone may be set to ±{24, 50, 92, 118, 158, 184, 226, 252, 266, 292, 334, 360, 400, 426, 468, 494}.

The 320 MHz band may consist of a contiguous band and a non-contiguous band.

The 320 MHz band may consist of first and second 160 MHz bands, and the first and second 160 MHz bands may be non-contiguous to each other. A location (or tone index) of respective pilot tone, of the first and second 160 MHz bands may be determined based on the second pilot tone. Specifically, a tone index of a third pilot tone for the first and second 160 MHz bands may include an index obtained by adding −512 to a tone index of the second pilot tone and an index obtained by adding +512 to an index of the second pilot tone.

Specifically, when the second tone plan is configured by combining the 26-tone RU or the 52-tone RU, a tone index of a pilot tone for a lower frequency 80 MHz band in the third pilot tone may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}, and a tone index of a pilot tone for a higher frequency 80 MHz band may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}.

When the second tone plan is configured by combining the 106-tone RU, the 242-tone RU, or the 484-tone RU, a tone index of a pilot tone for a lower frequency 80 MHz band in the third pilot tone may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}, and a tone index of a pilot tone for a higher frequency 80 MHz band may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}.

As another example, the 320 MHz band may consist of a contiguous 320 MHz band. A third pilot tone for the contiguous 320 MHz band may include a pilot tone for first to fourth 80 MHz bands. A tone index of a pilot tone for the first 80 MHz band may be an index obtained by adding −1536 to a tone index of the second pilot tone. A tone index of a pilot tone for the second 80 MHz band may be an index obtained by adding −512 to a tone index of the second pilot tone. A tone index of a pilot tone for the third 80 MHz band may be an index obtained by adding −+512 to a tone index of the second pilot tone. A tone index of a pilot tone for the fourth 80 MHz band may be an index obtained by adding −+1536 to a tone index of the second pilot tone. The contiguous 320 MHz band may consist of first to fourth 80 MHz bands in an ascending order of frequency. The first pilot tone (a pilot tone for the 320 MHz band) may consist of a third pilot tone indicated by the tone index.

That is, the third pilot tone may include a pilot tone for the first to fourth 80 MHz bands.

When the second tone plan is configured by combining the 26-tone RU or the 52-tone RU, a tone index of a pilot tone for the first 80 MHz band may be set to −{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}. A tone index of a pilot tone for the second 80 MHz may be set to −{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the third 80 MHz may be set to +{18, 32, 44, 58, 72, 86, 98, 112, 126, 140, 152, 166, 178, 192, 206, 220, 232, 246, 260, 274, 286, 300, 314, 328, 340, 354, 368, 382, 394, 408, 420, 434, 448, 462, 474, 488, 502, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006}. A tone index of a pilot tone for the fourth 80 MHz may be set to +{1042, 1056, 1068, 1082, 1096, 1110, 1122, 1136, 1150, 1164, 1176, 1190, 1202, 1216, 1230, 1244, 1256, 1270, 1284, 1298, 1310, 1324, 1338, 1352, 1364, 1378, 1392, 1406, 1418, 1432, 1444, 1458, 1472, 1486, 1498, 1512, 1526, 1546, 1560, 1574, 1586, 1600, 1614, 1628, 1640, 1654, 1666, 1680, 1694, 1708, 1720, 1734, 1748, 1762, 1774, 1788, 1802, 1816, 1828, 1842, 1856, 1870, 1882, 1896, 1908, 1922, 1936, 1950, 1962, 1976, 1990, 2004, 2016, 2030}.

When the second tone plan is configured by combining the 106-tone RU, the 242-tone RU, or the 484-tone RU, a tone index of a pilot tone for the first 80 MHz may be set to −{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}. A tone index of a pilot tone for the second 80 MHz may be set to −{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the third 80 MHz may be set to +{18, 44, 86, 112, 152, 178, 220, 246, 260, 286, 328, 354, 394, 420, 462, 488, 536, 562, 604, 630, 670, 696, 738, 764, 804, 846, 872, 912, 938, 980, 1006}. A tone index of a pilot tone for the fourth 80 MHz may be set to +{1042, 1068, 1110, 1136, 1176, 1202, 1244, 1270, 1284, 1310, 1352, 1378, 1418, 1444, 1486, 1512, 1560, 1586, 1628, 1654, 1694, 1720, 1762, 1788, 1802, 1828, 1870, 1896, 1936, 1962, 2004, 2030}.

When the EHT PPDU is transmitted to one receiving STA (in case of SU PPDU), the second tone plan (a tone plan for the 80 MHz band defined in the 802.11ax WLAN system) may be configured with a 996-tone RU. The 996-tone RU may be an RU including 996 tones. That is, an SU PPDU for the 320 MHz band may be transmitted based on a tone plan of the 4×996-tone RU. In addition, a tone index of the second pilot tone may be set to ±{24, 92, 158, 226, 266, 334, 400, 468}.

The 320 MHz band may consist of a contiguous band and a non-contiguous band.

For example, the 320 MHz band may consist of a non-contiguous 160+160 MHz band. One 160 MHz band in the non-contiguous 160+160 MHz band may consist of a first 996-tone RU and a second 996-tone RU. In the 160 MHz band, a tone index for the first 996-tone RU may be an index obtained by adding −512 to a tone index of the second pilot tone (a pilot tone for the 80 MHz band defined in the 802.11ax WLAN system). A tone index for the second 996-tone RU may be an index obtained by adding +512 to the tone index of the second pilot tone (a pilot tone for the 80 MHz band defined in the 802.11ax WLAN system).

Accordingly, the tone index of the pilot tone for the first 996-RU tone RU may be set to −{44, 112, 178, 246, 286, 354, 420, 488, 546, 604, 670, 738, 778, 846, 912, 980}. The tone index of the pilot tone for the second 996-RU tone RU may be set to +{44, 112, 178, 246, 286, 354, 420, 488, 546, 604, 670, 738, 778, 846, 912, 980}.

As another example, the 320 MHz band may consist of a contiguous 320 MHz band. A third pilot tone for the contiguous 320 MHz band may include a pilot tone for first to fourth 996-tone RUs. In the contiguous 320 MHz band, a tone index for the first 996-tone RU may be an index obtained by adding −1536 to the tone index of the second pilot tone (a pilot tone for the 80 MHz band defined in the 802.11ax WLAN system). A tone index for the second 996-tone RU may be an index obtained by adding −512 to the tone index of second pilot tone. A tone index for the third 996-tone RU may be an index obtained by adding +512 to the second pilot tone. A tone index for the fourth 996-tone RU may be an index obtained by adding +1536 to the tone index of the second pilot tone. The contiguous 320 MHz band may consist of the first to fourth 996-tone RUs in an ascending order of frequency. The first pilot tone (a pilot tone for the 320 MHz band) may consist of a third pilot tone indicated by the tone index.

That is, the third pilot tone may include a pilot tone for the first to fourth 996-tone RUs. A tone index of a pilot tone for the first 996-tone RU may be set to −{1068, 1136, 1202, 1270, 1310, 1378, 1444, 1512, 1560, 1628, 1694, 1762, 1802, 1870, 1936, 2004}. A tone index of a pilot tone for the second 996-tone RU may be set to −{44, 112, 178, 246, 286, 354, 420, 488, 546, 604, 670, 738, 778, 846, 912, 980}. A tone index of a pilot tone for the third 996-tone RU may be set to +{44, 112, 178, 246, 286, 354, 420, 488, 546, 604, 670, 738, 778, 846, 912, 980}. A tone index of a pilot tone for the fourth 996-tone RU may be set to +{1068, 1136, 1202, 1270, 1310, 1378, 1444, 1512, 1560, 1628, 1694, 1762, 1802, 1870, 1936, 2004}.

In addition, the receiving STA may decode the control field. The control field may include a universal-signal (U-SIG) and an extremely high throughput-signal (EHT-SIG). The information on the bandwidth may be included in a version independent field of the U-SIG.

The receiving STA may obtain information on a size of a band in which the EHT PPDU is transmitted based on the control field. The receiving STA may obtain the OFDMA tone plan, information on an RU in which the data field is received, and information the pilot tone, based on the EHT-SIG. That is, the receiving STA may decode the U-SIG to identify the size of the band in which the EHT PPDU is transmitted, and may decode the EHT-SIG to identify a location (or tone index) of the pilot tone.

In addition, the transmitting STA may transmit the EHT PPDU through the 240 MHz band. In this case, the information on the pilot tone may further include allocation information on that a fourth pilot tone for the 240 MHz is configured by repeating the second pilot tone. In addition, the information on the tone plan may include allocation information on that a third tone plan for the 240 MHz is configured by repeating three times the second tone plan.

When the EHT PPDU is transmitted to a plurality of receiving STAs (in case of MU PPDU), the second tone plan may be an OFDMA tone plan. The OFDMA tone plan may be configured by combining a 26-tone RU, a 52-tone RU, a 106-tone RU, a 242-tone RU, and a 484-tone RU. Likewise, the 240 MHz band may consist of a non-contiguous 160+80 MHz (or 80+160 MHz) band, or may consist of a contiguous 240 MHz band.

The 240 MHz band may consist of a contiguous band and a non-contiguous band as follows.

For example, the 240 MHz band may consist of a non-contiguous 160+80 MHz (or 80+160 MHz) band. Accordingly, the fourth pilot tone for the 240 MHz band may include a pilot tone for the 160 MHz band and a pilot tone for the 80 MHz band.

A tone index of a pilot tone for the 160 MHz bands may include an index obtained by adding −512 to a tone index of the second pilot tone and an index obtained by adding +512 to an index of the second pilot tone. A tone index of a pilot tone for the first 80 MHz band may include a tone index of the second pilot tone.

When the EHT PPDU is transmitted to one receiving STA (in case of SU PPDU), the second tone plan may be configured with a 996-tone RU. The 996-tone RU may be an RU including 996 tones. That is, an SU PPDU for the 240 MHz band may be transmitted based on a tone plan of the 3×996-tone RU.

The 240 MHz band may consist of a contiguous band and a non-contiguous band as follows.

For example, the 240 MHz band may consist of a non-contiguous 160+80 MHz (or 80+160 MHz) band. In the non-contiguous 160+80 MHz (or 80+160 MHz) band, the 160 MHz band may consist of a first 996-tone RU and a second 996-tone RU. The remaining 80 MHz band may consist of a third 996-tone RU. A pilot tone for the first 996-tone RU may use an index obtained by adding −512 to a tone index of the second pilot tone (a pilot tone for the 80 MHz band defined in the 802.11ax WLAN system). A pilot tone for the second 996-tone RU may use an index obtained by adding +512 to the tone index of the second pilot tone. A pilot tone for the third 996-tone RU may directly use a tone index of the second pilot tone. The fourth pilot tone may consist of a pilot tone for first and second 996-tone RUs for the 160 MHz band indicated by the tone index and a pilot tone for the third 996-tone RU for the 80 MHz band.

As another example, the 240 MHz band may consist of a contiguous 240 MHz band. The contiguous 240 MHz band may consist of first to third 996-tone RUs. In the contiguous 240 MHz band, a tone index of the pilot tone for the first 996-tone RU may be an index obtained by adding −1024 to the tone index of the second pilot tone (a pilot tone for the 80 MHz band defined in the 802.11ax WLAN system). A tone index of the pilot tone for the second 996-tone RU may directly use a tone index of the second pilot tone. A tone index of the pilot tone for the third 996-tone RU may be obtained by adding +1024 to the tone index of the second pilot tone. The fourth pilot tone may consist of a pilot tone for first to third 996-tone RUs indicated by the tone index.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    receiving, by a receiving station (STA), an extremely high throughput (EHT) physical protocol data unit (PPDU) from a transmitting STA through a 320 MHz band; and
    decoding, by the receiving STA, the EHT PPDU,
    wherein the EHT PPDU includes a control field and a data field,
    wherein the control field includes information on a pilot tone,
    wherein the information on the pilot tone includes allocation information on that a first pilot tone for the 320 MHz band is configured by repeating a second pilot tone for an 80 MHz band defined in an 802.11ax WLAN system,
    wherein the first pilot tone is received in the data field, based on the allocation information.

2. The method of claim 1, wherein the control field further includes information on a tone plan,
    wherein the information on the tone plan includes allocation information on that a first tone plan for the 320 MHz band is configured by repeating 4 times a second tone plan for the 80 MHz band defined in the 802.11ax WLAN system.

3. The method of claim 2, wherein, when the EHT PPDU is transmitted to a plurality of receiving STAs, the second tone plan is an orthogonal frequency division multiple access (OFDMA) tone plan,
    wherein the OFDMA tone plan is configured by combining a 26-tone resource unit (RU), a 52-tone RU, a 106-tone RU, a 242-tone RU, and a 484-tone RU,
    wherein the 26-tone RU is an RU including 26 tones,
    wherein the 52-tone RU is an RU including 52 tones,
    wherein the 106-tone RU is an RU including 106 tones,
    wherein the 242-tone RU is an RU including 242 tones, and
    wherein the 484-tone RU is an RU including 484 tones.

4. The method of claim 3, wherein,
    when the second tone plan is configured by combining the 26-tone RU or the 52-tone RU, a tone index of the second pilot tone is set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}, and
    when the second tone plan is configured by combining the 106-tone RU, the 242-tone RU, or the 484-tone RU, the second pilot tone is set to ±{24, 50, 92, 118, 158, 184, 226, 252, 266, 292, 334, 360, 400, 426, 468, 494}.

5. The method of claim 4, wherein, when the 320 MHz band consists of first and second 160 MHz bands, and the first and second 160 MHz bands are non-contiguous to each other, a tone index of a third pilot tone for the first and second 160 MHz bands includes an index obtained by adding −512 to a tone index of the second pilot tone and an index obtained by adding +512 to an index of the second pilot tone.

6. The method of claim 4, wherein, when the 320 MHz band consists of a contiguous 320 MHz band,
    a third pilot tone for the contiguous 320 MHz band includes a pilot tone for first to fourth 80 MHz bands,
    a tone index of a pilot tone for the first 80 MHz band is an index obtained by adding −1536 to a tone index of the second pilot tone, a tone index of a pilot tone for the second 80 MHz band is an index obtained by adding −512 to a tone index of the second pilot tone, a tone index of a pilot tone for the third 80 MHz band is an index obtained by adding −+512 to a tone index of the second pilot tone, and a tone index of a pilot tone for the fourth 80 MHz band is an index obtained by adding −+1536 to a tone index of the second pilot tone.

7. The method of claim 2, wherein, when the EHT PPDU is transmitted to one receiving STA, the second tone plan is configured with a 996-tone RU, and the 996-tone RU is an RU including 996 tones.

8. The method of claim 7, wherein a tone index of the second pilot tone is set to ±{24, 92, 158, 226, 266, 334, 400, 468}.

9. The method of claim 8, wherein, when the 320 MHz band consists of a non-contiguous 160+160 MHz band, one 160 MHz band in the non-contiguous 160+160 MHz band consists of first and second 996-tone RUs, a tone index of a pilot tone for the first 996-tone RU is an index obtained by adding −512 to a tone index of the second pilot tone, and a tone index of a pilot tone for the second 996-tone RU is an index obtained by adding +512 to the tone index of the second pilot tone.

10. The method of claim 8, wherein, when the 320 MHz band consists of a contiguous 320 MH band, a third pilot tone for the contiguous 320 MHz band includes a pilot tone for first to fourth 996-tone RUs, a tone index of a pilot tone for the first 996-tone RU is an index obtained by adding −1536 to a tone index of the second pilot tone, a tone index of a pilot tone for the second 996-tone RU is an index obtained by adding −512 to the tone index of the second pilot tone, a tone index of a pilot tone for the third 996-tone RU is an index obtained by adding +512 to a tone index of the second pilot tone, and a tone index of a pilot tone for the fourth 996-tone RU is an index obtained by adding +1536 to the tone index of the second pilot tone.

11. A receiving station (STA) in a wireless local area network (WLAN) system, the receiving STA comprising:
a memory;
a transceiver; and
a processor operatively coupled to the memory and the transceiver, wherein the processor is configured to:
receive an extremely high throughput (EHT) physical protocol data unit (PPDU) from a transmitting STA through a 320 MHz band; and
decode the EHT PPDU,
wherein the EHT PPDU includes a control field and a data field,
wherein the control field includes information on a pilot tone,
wherein the information on the pilot tone includes allocation information on that a first pilot tone for the 320 MHz band is configured by repeating a second pilot tone for an 80 MHz band defined in an 802.11ax WLAN system,
wherein the first pilot tone is received in the data field, based on the allocation information.

12. A method in a wireless local area network (WLAN) system, the method comprising:

generating, by a transmitting station (STA), an extremely high throughput (EHT) physical protocol data unit (PPDU); and
transmitting, by the transmitting STA, the EHT PPDU to at least one receiving STA through a 320 MHz band,
wherein the EHT PPDU includes a control field and a data field,
wherein the control field includes information on a pilot tone,
wherein the information on the pilot tone includes allocation information on that a first pilot tone for the 320 MHz band is configured by repeating a second pilot tone for an 80 MHz band defined in an 802.11ax WLAN system,
wherein the first pilot tone is received in the data field, based on the allocation information.

13. The method of claim 12, wherein the control field further includes information on a tone plan,
wherein the information on the tone plan includes allocation information on that a first tone plan for the 320 MHz band is configured by repeating 4 times a second tone plan for an 80 MHz band defined in the 802.11ax WLAN system.

14. The method of claim 13, wherein, when the EHT PPDU is transmitted to a plurality of receiving STAs, the second tone plan is an orthogonal frequency division multiple access (OFDMA) tone plan,
wherein the OFDMA tone plan is configured by combining a 26-tone resource unit (RU), a 52-tone RU, a 106-tone RU, a 242-tone RU, and a 484-tone RU,
wherein the 26-tone RU is an RU including 26 tones,
wherein the 52-tone RU is an RU including 52 tones,
wherein the 106-tone RU is an RU including 106 tones,
wherein the 242-tone RU is an RU including 242 tones, and
wherein the 484-tone RU is an RU including 484 tones.

15. The method of claim 14, wherein,
when the second tone plan is configured by combining the 26-tone RU or the 52-tone RU, a tone index of the second pilot tone is set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}, and
when the second tone plan is configured by combining the 106-tone RU, the 242-tone RU, or the 484-tone RU, the second pilot tone is set to ±{24, 50, 92, 118, 158, 184, 226, 252, 266, 292, 334, 360, 400, 426, 468, 494}.

16. The method of claim 15, wherein, when the 320 MHz band consists of first and second 160 MHz bands, and the first and second 160 MHz bands are non-contiguous to each other, a tone index of a third pilot tone for the first and second 160 MHz bands includes an index obtained by adding −512 to a tone index of the second pilot tone and an index obtained by adding +512 to an index of the second pilot tone.

17. The method of claim 15, wherein, when the 320 MHz band consists of a contiguous 320 MHz band,
a third pilot tone for the contiguous 320 MHz band includes a pilot tone for first to fourth 80 MHz bands,
a tone index of a pilot tone for the first 80 MHz band is an index obtained by adding −1536 to a tone index of the second pilot tone,
a tone index of a pilot tone for the second 80 MHz band is an index obtained by adding −512 to a tone index of the second pilot tone, a tone index of a pilot tone for the third 80 MHz band is an index obtained by adding −+512 to a tone index of the second pilot tone, and a tone index of a pilot tone for the fourth 80 MHz band is an index obtained by adding −+1536 to a tone index of the second pilot tone.

\* \* \* \* \*